(12) United States Patent
Jeong et al.

(10) Patent No.: US 8,952,620 B2
(45) Date of Patent: Feb. 10, 2015

(54) LIGHT EMITTING DIODE DRIVER

(71) Applicants: Jae Hong Jeong, Saratoga, CA (US); Minjong Kim, San Jose, CA (US)

(72) Inventors: Jae Hong Jeong, Saratoga, CA (US); Minjong Kim, San Jose, CA (US)

(73) Assignee: Altoran Chip and Systems, Inc., Santa Clara, CA (US)

( * ) Notice: Subject to any disclaimer, the term of this patent is extended or adjusted under 35 U.S.C. 154(b) by 0 days.

(21) Appl. No.: 14/266,539

(22) Filed: Apr. 30, 2014

(65) Prior Publication Data

US 2014/0232278 A1 Aug. 21, 2014

Related U.S. Application Data

(60) Division of application No. 13/528,850, filed on Jun. 21, 2012, now Pat. No. 8,901,849, which is a continuation-in-part of application No. 13/244,873, filed on Sep. 26, 2011, and a continuation-in-part of application No. 13/244,892, filed on Sep. 26, 2011, now Pat. No. 8,890,432, and a continuation-in-part of application No. 13/244,900, filed on Sep. 26, 2011.

(60) Provisional application No. 61/422,128, filed on Dec. 11, 2010.

(51) Int. Cl.
*H05B 37/00* (2006.01)
*H05B 33/08* (2006.01)

(52) U.S. Cl.
CPC ............ *H05B 33/083* (2013.01); *H05B 33/089* (2013.01); *H05B 33/0806* (2013.01)
USPC ............................ 315/186; 315/122; 315/294

(58) Field of Classification Search
USPC .......... 315/122, 185 R, 186, 192, 193, 200 R, 315/291, 294
See application file for complete search history.

(56) References Cited

U.S. PATENT DOCUMENTS

| 6,621,235 | B2 * | 9/2003 | Chang ........................... 315/216 |
| 6,989,807 | B2 | 1/2006 | Chiang |
| 7,081,722 | B1 | 7/2006 | Huynh et al. |
| 7,439,944 | B2 | 10/2008 | Huynh et al. |
| 8,749,173 | B1 * | 6/2014 | Melanson et al. ............ 315/307 |
| 2006/0175985 | A1 | 8/2006 | Huynh et al. |
| 2006/0208669 | A1 | 9/2006 | Huynh et al. |
| 2008/0116817 | A1 | 5/2008 | Chao et al. |
| 2009/0128055 | A1 | 5/2009 | Shin et al. |

(Continued)

FOREIGN PATENT DOCUMENTS

| JP | 2007-123562 A | 5/2007 |
| JP | 2007-173813 A | 7/2007 |

(Continued)

*Primary Examiner* — Tung X Le
(74) *Attorney, Agent, or Firm* — Patent Office of Dr. Chung Park

(57) ABSTRACT

A driver circuit for driving light emitting diodes (LEDs). The driver circuit includes: a string of LEDs divided into n groups, the n groups of LEDs being electrically connected to each other in series, a downstream end of group m−1 being electrically connected to the upstream end of group m, where m is a positive number equal to or less than n. The driver circuit also includes a plurality of current regulating circuits, each of the current regulating circuits being coupled to the downstream end of a corresponding group at one end and coupled to the ground at the other end and including a sensor amplifier and a cascode having first and second transistors, each sensor amplifier being coupled to a different voltage source for providing a different reference voltage thereto.

12 Claims, 20 Drawing Sheets

(56) References Cited

U.S. PATENT DOCUMENTS

| | | | |
|---|---|---|---|
| 2009/0261743 A1* | 10/2009 | Chen et al. | 315/192 |
| 2010/0194298 A1 | 8/2010 | Kuwabara | |
| 2010/0308738 A1 | 12/2010 | Shteynberg et al. | |
| 2010/0308739 A1 | 12/2010 | Shteynberg et al. | |
| 2011/0089844 A1* | 4/2011 | Grajcar | 315/193 |
| 2011/0273102 A1* | 11/2011 | van de Ven et al. | 315/193 |
| 2012/0081009 A1 | 4/2012 | Shteynberg et al. | |
| 2014/0103838 A1* | 4/2014 | Zheng et al. | 315/307 |

FOREIGN PATENT DOCUMENTS

| | | |
|---|---|---|
| JP | 2010-225742 A | 10/2010 |
| KR | 10-2008-0034316 A | 4/2008 |
| KR | 10-2009-0050381 A | 5/2009 |
| KR | 10-0905844 B1 | 7/2009 |
| KR | 10-2010-0067468 A | 6/2010 |
| KR | 10-0973014 B1 | 7/2010 |
| KR | 10-0997050 B1 | 11/2010 |
| WO | 2012-034102 A1 | 3/2012 |
| WO | 2012-061999 A1 | 5/2012 |

* cited by examiner

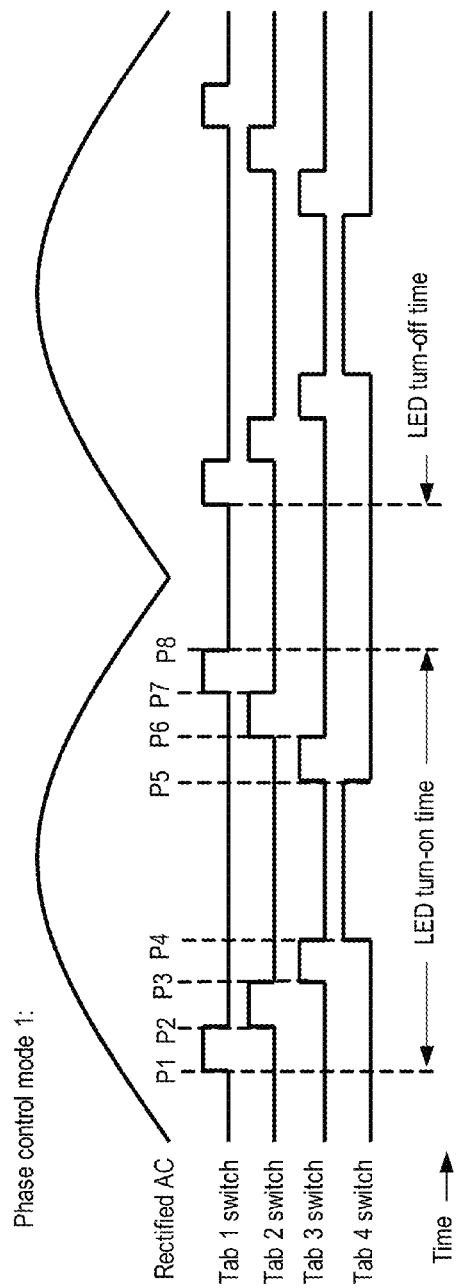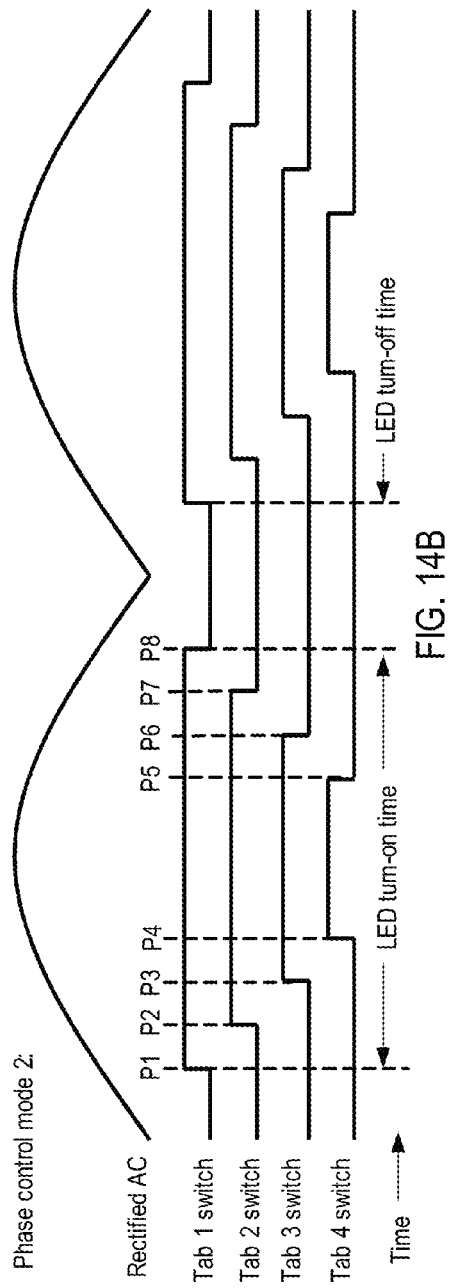

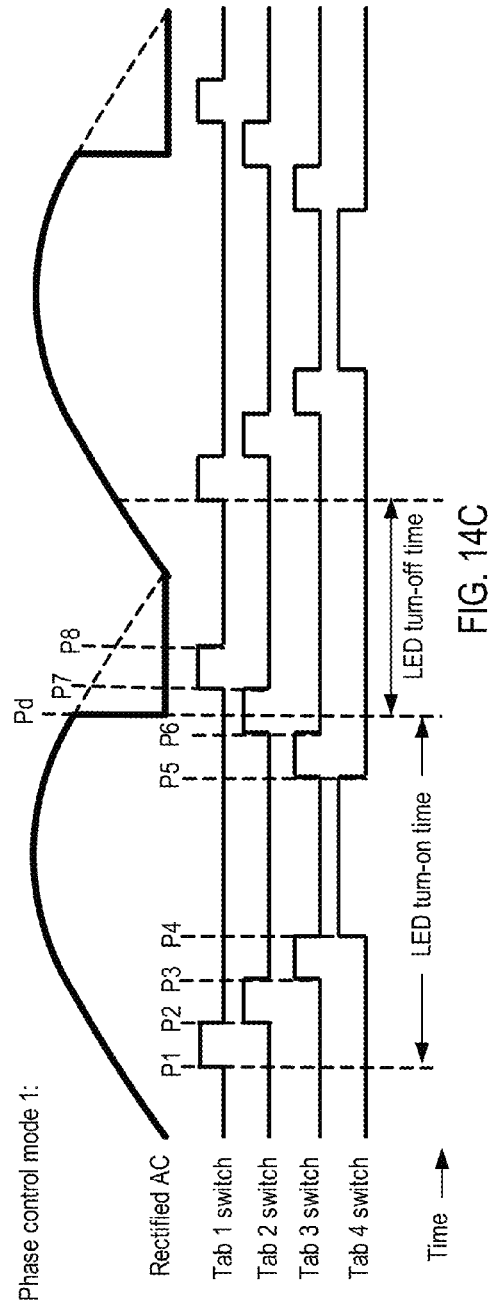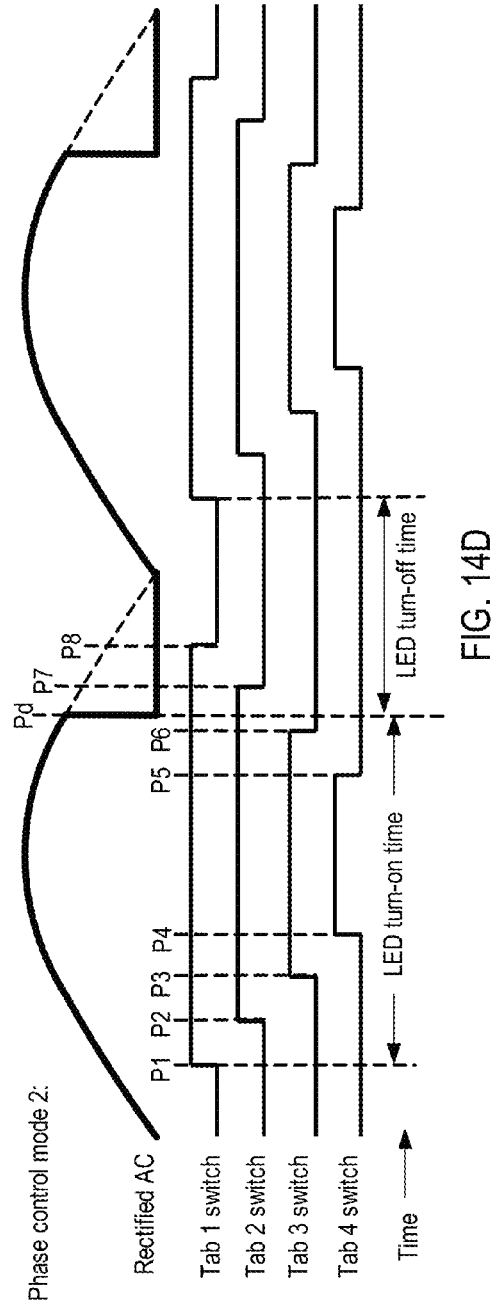

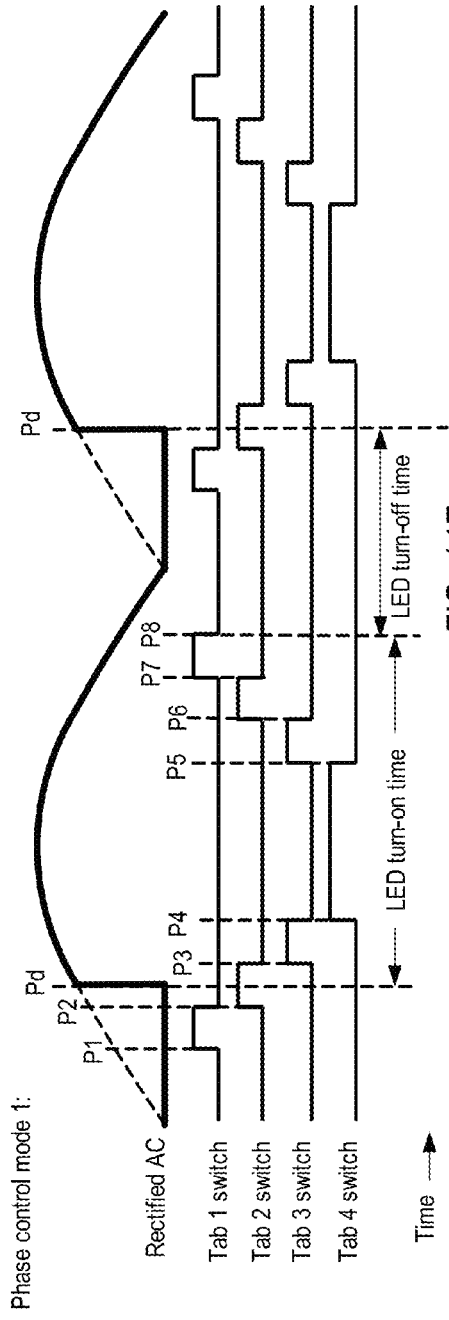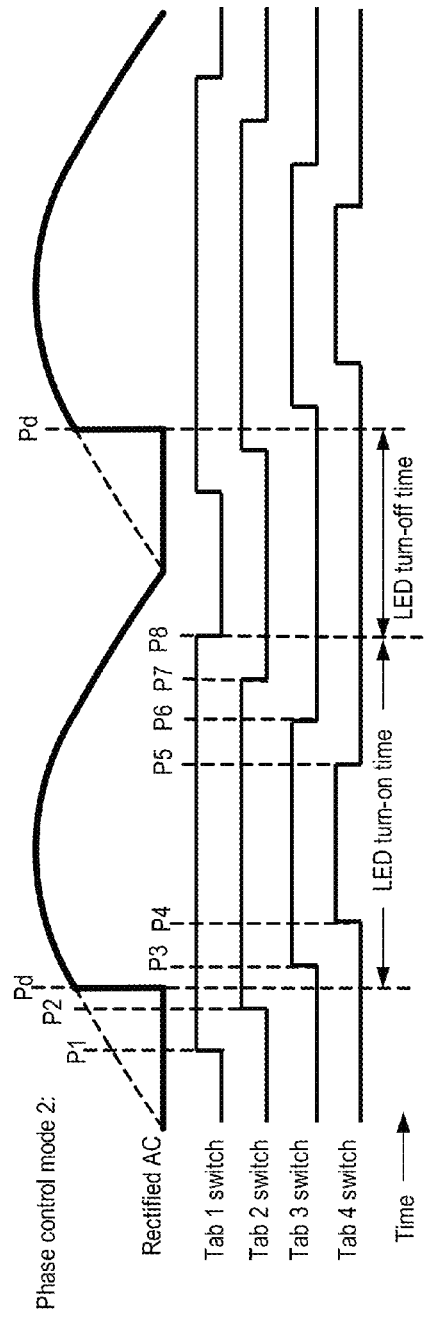

LIGHT EMITTING DIODE DRIVER

CROSS REFERENCES

This application is a divisional application of application Ser. No. 13/528,850, filed Jun. 21, 2012, which is a continuation-in-part of application Ser. Nos. 13/244,873, 13/244,892, and 13/244,900, all of which are filed on Sep. 26, 2011 and claim the benefit of U.S. Provisional Application No. 61/422,128, filed on Dec. 11, 2010, and hereby incorporated by reference in their entirety.

BACKGROUND OF THE INVENTION

The present invention relates to a light emitting diode (LED) driver, and more particularly, to a circuit for driving a string of light emitting diode (LEDs).

Due to the concept of low energy consumption, LED lamps are prevailing and considered a practice for lighting in the era of energy shortage. Typically, an LED lamp includes a string of LEDs to provide the needed light output. The string of LEDs can be arranged either in parallel or in series or a combination of both. Regardless of the arrangement type, providing correct voltage and/or current is essential to efficient operation of the LEDs.

In application where the power source is periodic, the LED driver should be able to convert the time varying voltage to the correct voltage and/or current level. Typically, the voltage conversion is performed by circuitry commonly known as AC/DC converters. These converters, which employ an inductor or transformer, capacitor, and/or other components, are large in size and have short life, which results in an undesirable form factor in lamp design, high manufacturing cost, and reduction in system reliability. Accordingly, there is a need for an LED driver that is reliable and has a small form factor to thereby reduce the manufacturing cost.

SUMMARY OF THE INVENTION

In one embodiment of the present disclosure, a method for driving light emitting diodes (LEDs) includes: providing a string of LEDs divided into groups, the groups being electrically connected to each other in series; providing a power source electrically connected to the string of LEDs; coupling each of the groups to a ground through a separate current regulating circuit, the separate current regulating circuit including a cascode structure having first and second transistors; applying a different reference voltage to the separate current regulating circuit of each said group; and increasing an input voltage from the power source to turn on the groups in a downstream sequence.

In another embodiment of the present disclosure, a driver circuit for driving light emitting diodes (LEDs) includes: a string of LEDs divided into n groups, the n groups of LEDs being electrically connected to each other in series, a downstream end of group m−1 being electrically connected to the upstream end of group m, where m being a positive number equal to or less than n; and a plurality of current regulating circuits, each of the current regulating circuits being coupled to the downstream end of a corresponding group at one end and coupled to a ground at an other end and including a sensor amplifier and a cascode having first and second transistors, each said sensor amplifier being coupled to a different voltage source for providing a different reference voltage thereto.

In another embodiment of the present disclosure, a method for driving light emitting diodes (LEDs) includes: providing a string of LEDs divided into groups, the groups being electrically connected to each other in series; providing a power source electrically connected to the string of LEDs; coupling each of the groups to a ground through a separate current regulating circuit, the separate current regulating circuit including a transistor and a sensor amplifier, an output pin of the sensor amplifier being coupled to a gate of the transistor; applying a different reference voltage to the sensor amplifier of each said group; and increasing an input voltage from the power source to turn on the groups in a downstream sequence.

In another embodiment of the present disclosure, a driver circuit for driving light emitting diodes (LEDs) includes: a string of LEDs divided into n groups, the n groups of LEDs being electrically connected to each other in series, a downstream end of group m−1 being electrically connected to the upstream end of group m, where m being a positive number equal to or less than n; and a plurality of current regulating circuits, each of the current regulating circuits being coupled to the downstream end of a corresponding group at one end and coupled to a ground at an other end and including a sensor amplifier and a transistor, the sensor amplifier being coupled to a different voltage source for providing a different reference voltage thereto.

In another embodiment of the present disclosure, a method for driving light emitting diodes (LEDs) includes: providing a string of LEDs divided into groups, the groups being electrically connected to each other in series; providing a power source electrically connected to the string of LEDs; coupling each of the groups to a ground through a corresponding one of current regulating circuits, each said group being coupled to a different reference voltage source for providing a different reference voltage thereto; measuring a phase of a voltage waveform of the power source; and turning on the groups in a downstream sequence based on the measured phase.

In another embodiment of the present disclosure, a driver circuit for driving light emitting diodes (LEDs) includes: a string of LEDs divided into n groups, the n groups of LEDs being electrically connected to each other in series, a downstream end of group m−1 being electrically connected to the upstream end of group m, where m being a positive number equal to or less than n, an upstream end of group 1 being configured to be coupled to a power source that provides an input voltage; a plurality of current regulating circuits, each of the current regulating circuits being coupled to the downstream end of a corresponding group at one end and coupled to a ground at an other end and including a sensor amplifier and a cascode having first and second transistors, each of the current regulating circuits being coupled to a different reference voltage source; and a phase control logic for sending a signal to each of the current regulating circuits to thereby control a current flow through each of the current regulating circuits.

In another embodiment of the present disclosure, a method for driving light emitting diodes (LEDs) includes: providing a string of LEDs divided into groups, the groups being electrically connected to each other in series; providing a power source electrically connected to the string of LEDs; coupling each of the groups to a ground through a separate current regulating circuit, the separate current regulating circuit including a cascode structure having first and second transistors and a third transistor identical to the second transistor, a gate of the second transistor being directly connected to a gate of the third transistor to thereby form a current mirror; applying a different current to the third transistor of each said group; and increasing an input voltage from the power source to turn on the groups in a downstream sequence.

In another embodiment of the present disclosure, a driver circuit for driving light emitting diodes (LEDs) includes: a string of LEDs divided into n groups, the n groups of LEDs being electrically connected to each other in series, a downstream end of group m−1 being electrically connected to the upstream end of group m, where m being a positive number equal to or less than n; and a plurality of current regulating circuits, each of the current regulating circuits being coupled to the downstream end of a corresponding group at one end and coupled to a ground at an other end and including a cascode having first and second transistors and a third transistor identical to the second transistor, a gate of the second transistor being directly connected to a gate of the third transistor to thereby form a current mirror.

These and other features, aspects and advantages of the present invention will become better understood with reference to the following drawings, description and claims.

BRIEF DESCRIPTION OF THE DRAWINGS

FIGS. 14A-14F show output signals of the frequency detector and phase control logic of FIGS. 10 and 11.

DETAILED DESCRIPTION OF THE INVENTION

Figure 1:
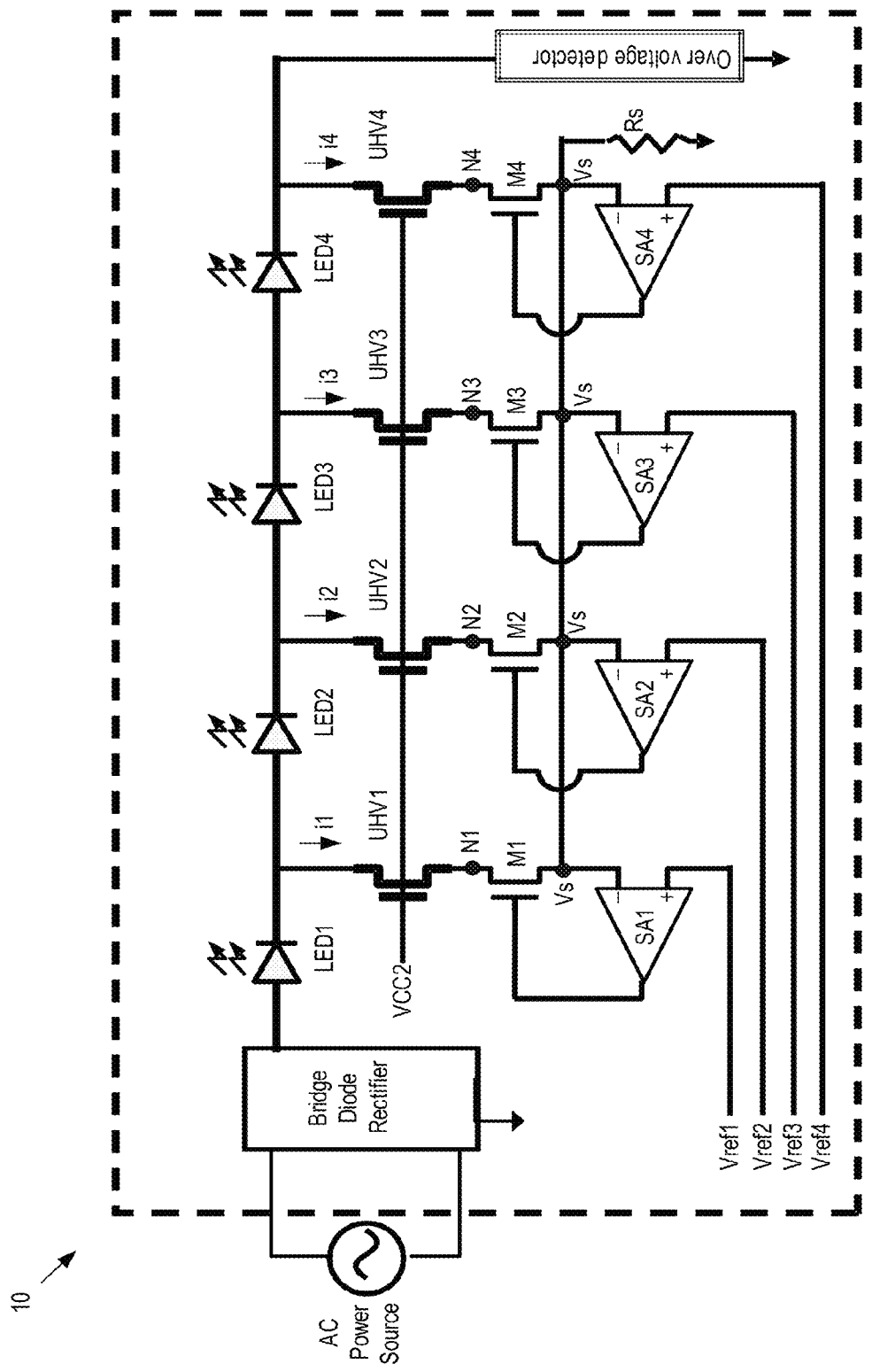
FIG. 1 shows a schematic diagram of an LED driver circuit in accordance with one embodiment of the present invention.

Referring now to FIG. 1, there is shown a schematic diagram of an LED driver circuit (or, shortly driver) 10 in accordance with one embodiment of the present invention. As depicted, the driver 10 is powered by a power source such as an alternative current (AC) power source. The electrical current from the AC power source is rectified by a rectifier circuit. The rectifier circuit can be any suitable rectifier circuit, such as bridge diode rectifier, capable of rectifying the alternating power from the AC power source. The rectified voltage Vrect is then applied to a string of light emitting diodes (LEDs). If desirable, the AC power source and the rectifier may be replaced by a direct current (DC) power source.

The LEDs as used herein is the general term for many different kinds of light emitting diodes, such as traditional LED, super-bright LED, high brightness LED, organic LED, etc. The drivers of the present invention are applicable to all kinds of LED.

As depicted in FIG. 1, a string of LEDs is electrically connected to the power source and divided into four groups. However, it should be apparent to those of ordinary skill in the art that the string of LEDs may be divided into any suitable number of groups. The LEDs in each group may be a combination of the same or different kind, such as different color. They can be connected in serial or parallel or a mixture of both. Also, one or more resistances may be included inside each group, say LED1.

A separate current regulating circuit (or, shortly regulating circuit) is connected to the downstream end of each LED group, where the current regulating circuit collectively refers to a group of elements for regulating the current flow, say i1, and includes a first transistor (say, UHV1), a second transistor (say, M1), and a sensor amplifier (say, SA1). Hereinafter, the term transistor refers to an N-Channel MOSFET, a P-Channel MOSFET, an NPN-bipolar transistor, a PNP-bipolar transistor, an Insulated gate Bipolar Transistor (IGBT), analog switch, or a relay.

The first and second transistors are electrically connected in series, forming a cascode structure. The first transistor is capable of shielding the second transistor from high voltages. As such, the first transistor is referred as shielding transistor hereinafter, even though its function is not limited to shielding the second transistor. The main function of the second transistor includes regulating the current i1, and as such, the second transistor is referred as regulating transistor hereinafter. The shielding transistor may be an ultra-high-voltage (UHV) transistor that has a high breakdown voltage of 500 V, for instance, while the regulating transistor M1 may be a low-voltage (LV), medium-voltage (MV), or a high-voltage (HV) transistor and has a lower breakdown voltage than the shielding transistor. The node, such as N1, refers to the point where the source of the shielding transistor is connected to the drain of the regulating transistor.

The voltage Vs can be represented by the equation:

$$Vs = (i1 + i2 + i3 + i4) * Rs,$$

where Rs refers to the current sensing resistor.

The sensor amplifier SA1, which may be an operational amplifier, compares the voltage Vs with the reference voltage Vref1, and outputs a signal that is input to the gate of the regulating transistor, to thereby form a feedback control of the current i1 flowing through the cascode and the resistor Rs. The gate voltage of the shielding transistor may be set to a constant voltage, Vcc2. (Hereinafter, Vcc2 refers to a constant voltage.) The mechanism for generating the constant gate voltage Vcc2 is well known in the art, and as such, the detailed description of the mechanism is not described in the present document.

As discussed above, each current regulating circuit is electrically connected to the downstream end of the corresponding LED group at one end and to the ground at the other end via the current sensing resistor Rs. The regulating transistors M1, M2, M3, and M4 have a common sensor voltage Vs. Hereinafter, the terms "common sensor voltage" and "common source voltage" refer to the voltage Vs.

The references voltages Vref1, Vref2, Vref3 and vref4 are set to different values. For instance, the reference voltages may satisfy the condition, Vref1<Vref2<Vref3<Vref4, so that the driver 10 can turn on/off each group of LEDs successively as the level of Vrect changes. As the voltage of the power source starts increasing from zero, Vrect may not be high enough to cause the electrical current to flow through the LEDs. At this stage, Vs is lower than the reference voltages Vref1-Vref4, and thus, the sensor amplifiers SA1, SA2, SA3, and SA4 turn on the regulating transistors M1, M2, M3, and M4, respectively.

As the voltage of the power source increases enough to turn on the first LED group, LED1 (or Group 1), that is located immediately downstream of the power source, the first regulating circuit, i.e., UHV1, M1, and SA1, conducts and the current i1 flows to the ground. Note that the first current regulating circuit may be turned on before, at, or after the rectified voltage Vrect reaches a level enough to power LED1. The same analogy applies to other regulating circuits corresponding to Groups 2-4. When Vrect is high enough to power LED1 but not enough to turn on LED2, the sensor amplifier SA1 compares the voltage level Vs with the reference voltage Vref1 and sends a control signal to the regulating transistor, M1. More specifically, the output signal of the sensor amplifier SA1 is input to the gate of the regulating transistor M1.

As Vrect increases, it reaches a level enough to power LED1 and LED2. Then, the second regulating circuit (i.e., UHV2, M2, and SA2) conducts, and LED1 and LED2 are turned on. As discussed above, the second current regulating circuit may be turned on before, at, or after Vrect reaches the level enough to power LED1 and LED2. The sensor amplifier SA2 compares the voltage level Vs with Vref2 and sends a control signal to the regulating transistor, M2.

When the second current regulating circuit is on, the overall efficiency of the driver 10 will be enhanced if the current i1 is cut off (or, set to a minimal level). It is because LED2 would produce more light if more current flows therethough, and, cutting off (or reducing) the current i1 would cause the current i1 to be redirected to LED2. In the driver 10, as the current i2 starts flowing, the voltage Vs further increases and exceeds Vref1 at some point in time. At this point, the SA1 sends a signal to M1, to thereby reduce the current i1.

As Vrect further increases, the current i2 further increases. Also, the current i1 further decreases. The current i1 is completely blocked by the sensor amplifier SA1 eventually when Vref1 is less than Vs, where Vs is expressed by an equation Vs=i2*Rs. At this point, only the current i2 flows through LED1 and LED2, and is regulated by the sensor amplifier SA2.

Same analogy applies for subsequent groups. Generally speaking, when a downstream LED group is turned on and the current regulating circuit associated with the downstream group conducts, the current regulating circuit associated with upstream groups can be turned off (or, the current flowing through the regulating circuit is set to a minimal level) to enhance the overall efficiency of the driver circuit 10.

Once the source voltage (or the rectified voltage Vrect) reaches its peak and starts descending, the above process reverses so that the first current regulating circuit turns back on last. Note that as the source voltage decreases to a level insufficient to keep the downstream group on, the downstream group is naturally turned off even though its associated regulating circuit might be on.

As discussed above, each regulating circuit includes two transistors, such as UHV1 and M1, arranged in series to form a cascode structure. The cascode structure, which is implemented as a current sink, has various advantages compared to a single transistor current sink. First, it has enhanced current driving capability. When operating in its saturation region, which is desired for a current sink, the current driving capability (Idrv) of an LV/MV/HV NMOS is far superior to an UHV NMOS. For example, Idrv of a typical LV NMOS is 500 μA/μm whereas that of a typical UHV NMOS is 10~20 μA/μm. Thus, to regulate the same amount of current flow, the required projection area of an UHV NMOS on the chip is at least 20 times as large as that of an LV NMOS. Also, a typical UHV NMOS has the minimum channel length of 20 μm, while a typical LV NMOS has the minimum channel length of 0.5 μm. However, a typical LV NMOS requires a shielding mechanism that offers protection from high voltages. In the cascode structure, the first transistor, preferably UHV NMOS, operates as a shielding transistor, while the second transistor, preferably LV/MV/HV NMOS, operates as a current regulator, providing enhanced current driving capability. The shielding transistor is not operating in saturation region as would be in the case where a single UHV NMOS is used as the current sink and operated in the linear region. As such, the current driving capability Idrv is not the determinative design factor; rather the resistance of the shielding transistor, Rdson, is the important factor in designing the UHV NMOS of the cascode.

Second, due to the series configuration of the cascode structure, the required voltage (a.k.a. voltage compliance or voltage headroom) of the cascode structure can be higher than a single UHV NMOS configuration. For an LED driver case, however, the power loss due to the required voltage is much less than the power loss due to the LED driving voltage. For example, in an AC-driven LED driver case, the LED driving voltage (voltage on the LED anode) ranges 100 Vmrs~250 Vrms. Assume the required voltage of a single UHV NMOS is 2V whereas that of a cascode structure is 5V. In this case, the efficiencies are 98~99% and 95~98%, respectively. Of course, Rdson can be reduced so that the required voltage of the cascode structure can be about the same as that of a single UHV NMOS. The point is that the additional power consumed by the cascode structure is a minor disadvantage. If efficiency is a crucial design factor, the cascode structure can be designed in a current mirror configuration whereas a current mirror configuration using two UHV NMOS transistors is not practically feasible due to their large area on the chip.

Third, turning on/off the current sink is easier in the cascode structure since the UHV MOS and LV/MV/HV NMOS are controlled separately. In a single UHV NMOS current sink, both current regulation and on/off action have to be done by controlling the gate of the UHV NMOS, which has the characteristics of a large capacitor. In contrast, in the cascode structure, the current regulation can be done by controlling the LV/MV/HV NMOS and on/off action can be done by controlling the UHV NMOS that requires only logic operation applied on the gate.

Fourth, the speed of turning on/off is controlled more smoothly in the cascode structure than a single UHV NMOS configuration. In a single UHV NMOS configuration, the linear control of current cannot be easily achieved by controlling the gate voltage since the current is a square function of the gate voltage. By contrast, in a cascode structure, when the gate of the LV/MV/HV NMOS is controlled, the current control (slewing) becomes smoother since it is operating as a resistor that is an inverse function of the gate voltage.

Fifth, the cascode structure provides better noise immunity. Noise from the power supply can propagate through the LEDs and subsequently can be coupled to the current regulating circuit. More specifically, the noise is introduced into the feedback loop of the current regulating circuit. In a single UHV NMOS configuration, this noise is directly coupled to this loop, whereas, in a cascode structure, the noise is attenuated by the ratio of Rdson of the UHV NMOS to the effective resistance of the LV/MV/HV NMOS.

Sixth, the noise generated by a cascode structure is lower than a single UHV NMOS configuration. In the cascode structure, the current control is mainly performed by the regulating transistor, while, in a single UHV NMOS configuration, the current control is performed by the UHV NMOS. Since the gate capacitance of the LV/MV/HV NMOS is lower than the UHV NMOS, the noise generated by the cascode structure is lower than a single UHV NMOS configuration.

It is noted that the shielding transistors UHV1-UHV4 may be identical or different from each other. Likewise, the regulating transistors M1-M4 may be identical or different from each other. The specifications of the shielding and regulating transistors may be selected to meet the designer's objectives.

Figure 2:
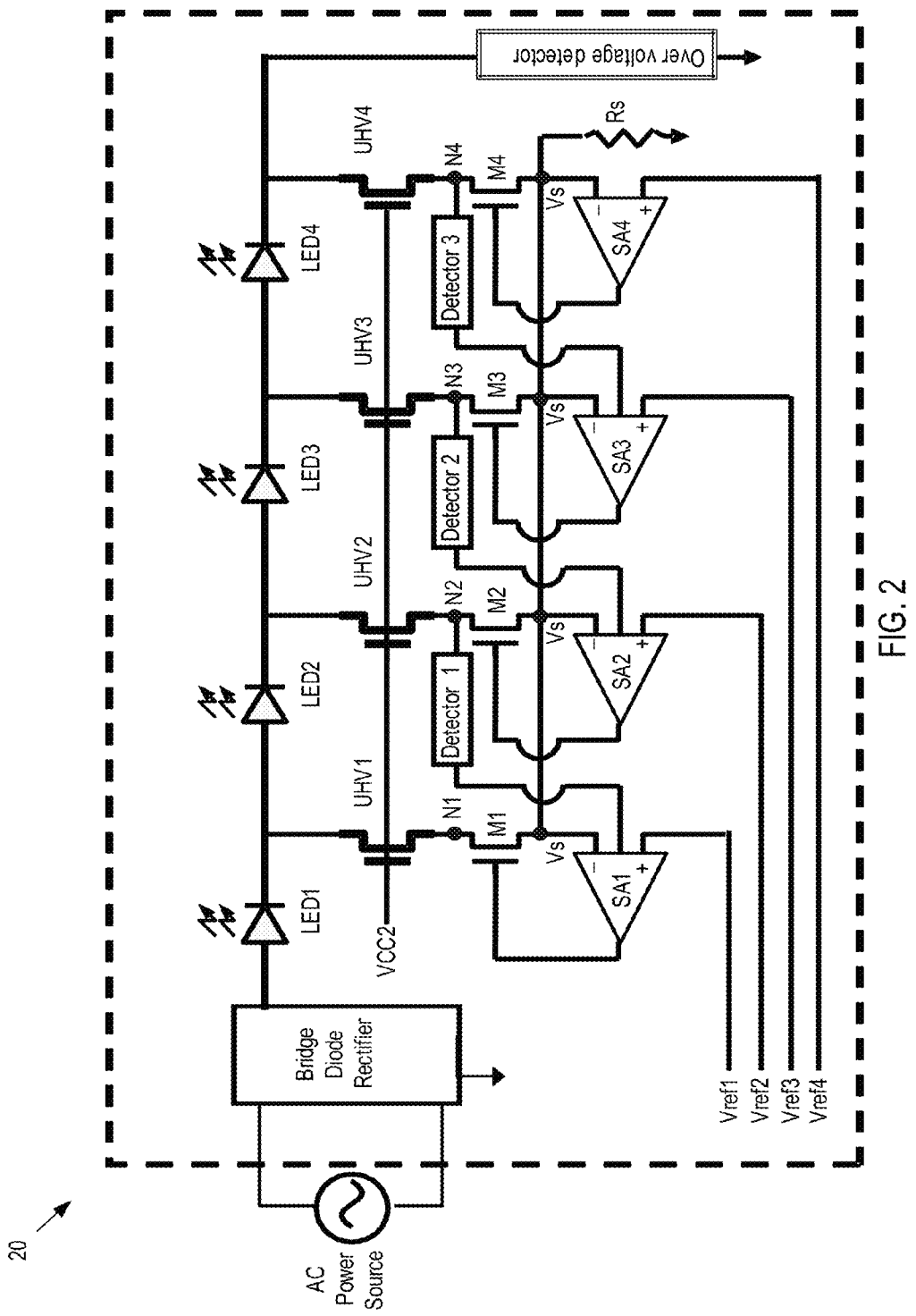
FIG. 2 shows a schematic diagram of an LED driver circuit in accordance with another embodiment of the present invention.

FIG. 2 shows a schematic diagram of an LED driver circuit 20 in accordance with another embodiment of the present invention. As depicted, the driver circuit 20 is similar to the driver circuit 10 in FIG. 1, the difference being that detector 1, detector 2, and detector 3 are used to detect the voltages at the nodes N2, N3, and N4, respectively. Each detector can be an operational amplifier, an inverter, (logic gate), or a Schmitt trigger, for instance. Each detector sends a signal to the sensor amplifier associated with the upstream LED group to thereby control the current flowing through the current regulating circuit. For instance, when the rectified voltage Vrect is high enough to turn on the LED1 and LED2, the detector 1 monitors the voltage level at the node N2. As the voltage at the node N2 further increases to reach a preset voltage level, the detector 1 sends a signal to the sensor amplifier SA1. Subsequently, the sensor amplifier SA1 may turn off the current i1 (or, set the current i1 to a minimal level) by controlling the gate voltage of the regulating transistor M2. Once Vrect reaches its peak level and descends, the above process reverses.

The same analogy applies to the other detectors. For instance, the detector 2 monitors the voltage level at the node 3 and sends a signal to the sensor amplifier SA2 to control the current flow i2. It is noted that the sensor amplifier SA2 also compares the reference voltage Vref2 to the voltage Vs to control the gate voltage of the regulating transistor M2. Thus, the sensor amplifier SA2 takes three input voltages to control the current flow i2; the voltage level at the node N3, the voltage Vs (i.e., the source voltage) of the regulating transistor M2, and the reference voltage Vref2.

Figure 3:
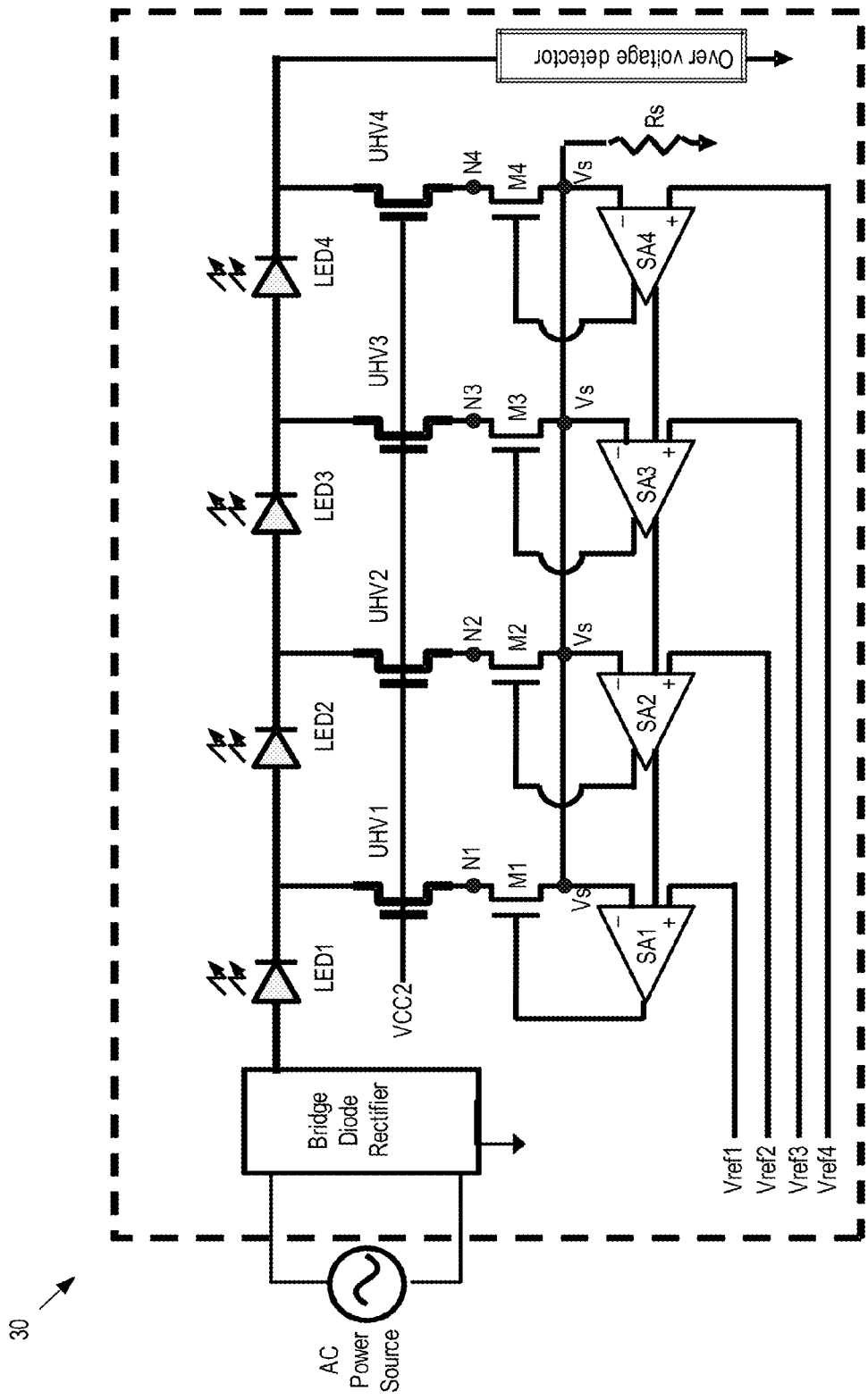
FIG. 3 shows a schematic diagram of an LED driver circuit in accordance with another embodiment of the present invention.

FIG. 3 shows a schematic diagram of an LED driver circuit 30 in accordance with another embodiment of the present invention. As depicted, the driver circuit 30 is similar to the driver circuit 10, the difference being that an output signal of a sensor amplifier, say SA2, is input to the upstream sensor amplifier, say SA1. For example, when the voltage Vs reaches a preset level, the sensor amplifier SA2 sends a signal to the sensor amplifier SA1, and subsequently, the sensor amplifier SA1 may decrease its output voltage level so that the regulating transistor M1 turns off the current flow i1. Thus, the sensor amplifier SA1 takes three input voltages to control the current flow i1; the output from the sensor amplifier SA2, the voltage Vs (i.e., the source voltage) of the regulating transistor M1, and the reference voltage Vref1.

Figure 4:
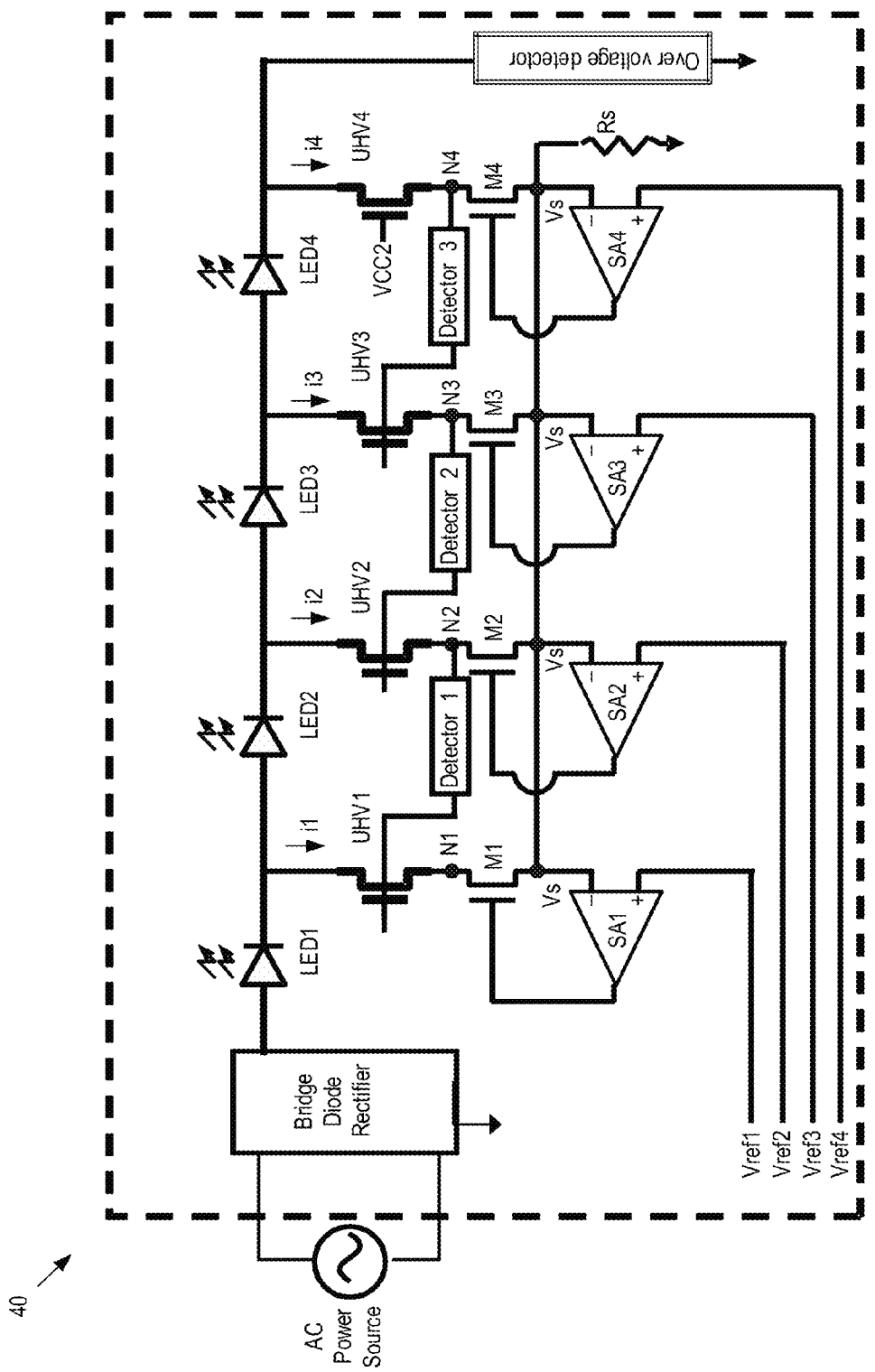
FIG. 4 shows a schematic diagram of an LED driver circuit in accordance with another embodiment of the present invention.

FIG. 4 shows a schematic diagram of an LED driver circuit 40 in accordance with another embodiment of the present invention. As depicted, the driver circuit 40 is similar to the driver circuit 20 in FIG. 2, the difference being that the output pin of each of the detectors is connected to the gate of the first transistor of the upstream current regulating circuit. Each detector sends an output signal to the gate of the first (or, shielding) transistor associated with the upstream LED group to thereby control the current flowing through the current regulating circuit. For instance, when the rectified voltage Vrect is high enough to turn on LED1 and LED2, the detector 1 monitors the voltage level at the node N2. As the voltage at the node N2 further increases to reach a preset voltage level, the detector 1 sends an output signal to the gate of UHV1. Subsequently, UHV1 turns off the current i1 (or, set the current i1 to a minimal level).

The same analogy applies to the other detectors. For instance, the detector 2 monitors the voltage level at the node 3 and sends an output signal to UHV2 to control the current flow i2. It is noted that UHV4, the first transistor of the current regulating circuit associated with LED4, the last LED group, has a constant gate voltage Vcc2.

Figure 5:
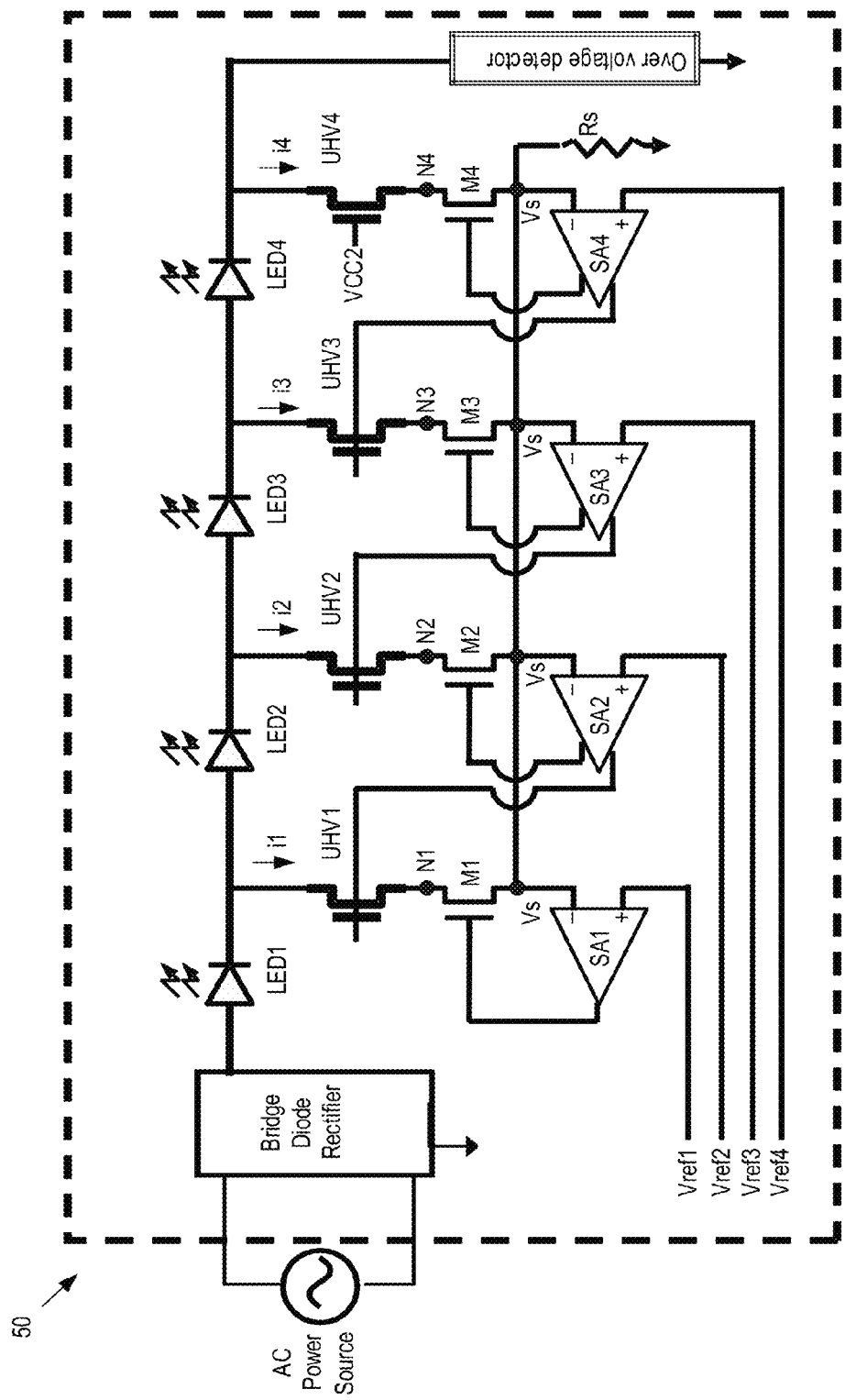
FIG. 5 shows a schematic diagram of an LED driver circuit in accordance with another embodiment of the present invention.

FIG. 5 shows a schematic diagram of an LED driver circuit 50 in accordance with another embodiment of the present invention. As depicted, the driver circuit 50 is similar to the driver circuit 10 in FIG. 1, the difference being that an output pin of a sensor amplifier is connected to the gate of the first transistor of the upstream current regulating circuit, to thereby control the current flowing through the upstream current regulating circuit. For instance, when the rectified voltage Vrect is high enough to turn on the LED1 and LED2, the sensor amplifier SA2 sends an output signal to the gate of UHV1, to thereby reduce the current i1. As Vrect further increases, UHV1 turns off the current i1 (or, set the current i1 to a minimal level).

The same analogy applies to the other sensor amplifiers. For instance, the sensor amplifier SA3 sends an output signal to UHV2 to control the current flow i2. It is noted that UHV4, the first transistor of the current regulating circuit associated with LED4, the last LED group, has a constant gate voltage Vcc2.

Figure 6:
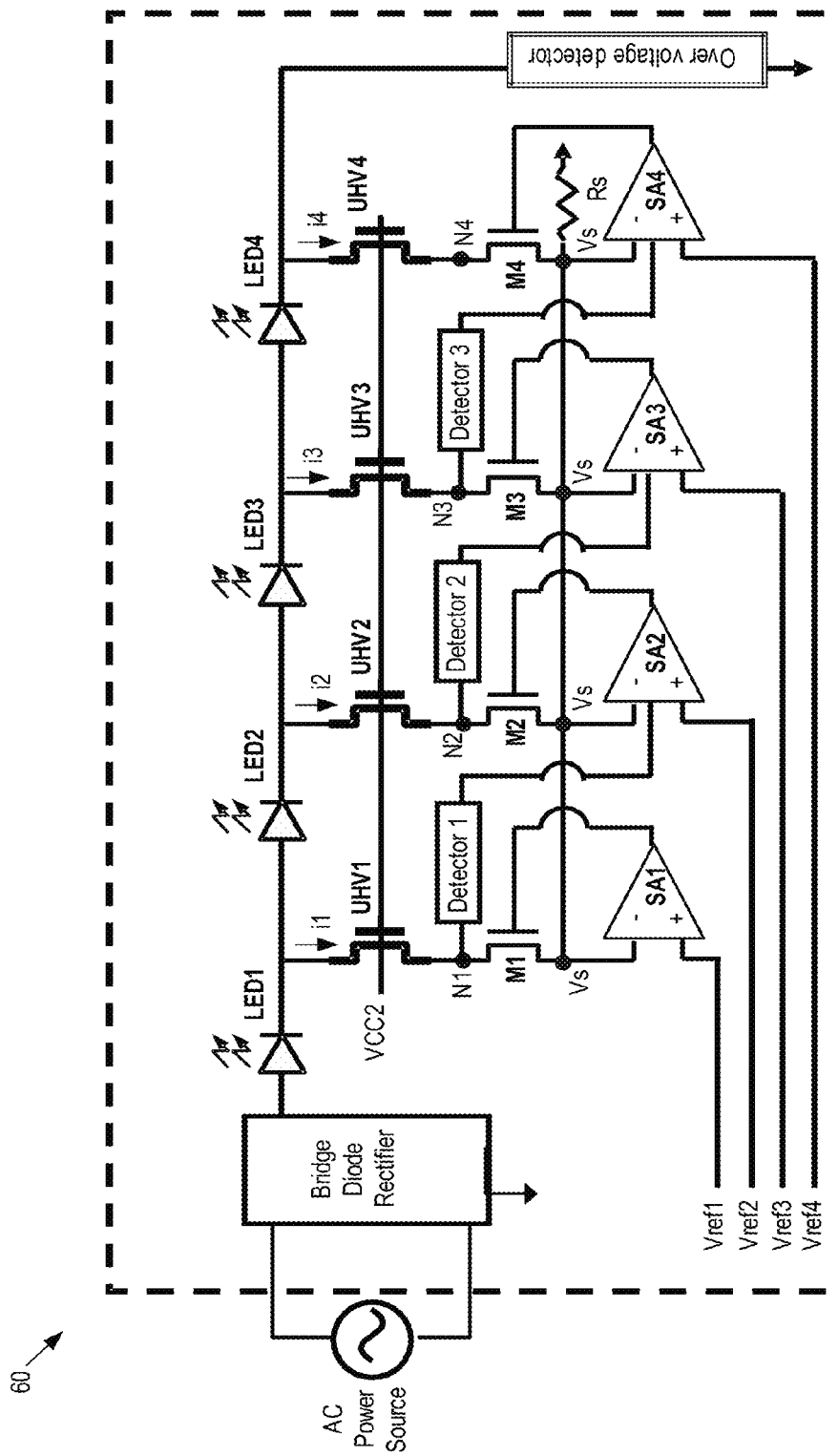
FIG. 6 shows a schematic diagram of an LED driver circuit in accordance with another embodiment of the present invention.

FIG. 6 shows a schematic diagram of an LED driver circuit 60 in accordance with another embodiment of the present invention. As depicted, the driver circuit 60 is similar to the driver circuit 10 in FIG. 1, the difference being that detector 1, detector 2, and detector 3 are used to detect the voltages at the nodes N1, N2, and N3, respectively. Each detector can be an operational amplifier, an inverter, (logic gate), or a Schmitt trigger, for instance. Each detector sends a signal to the sensor amplifier associated with the downstream LED group to thereby control the current flowing through the current regulating circuit.

When the voltage levels at each node, say N1, is lower than a preset threshold level, the detector 1 sends its output signal to the sensor amplifier SA2 so that the sensor amplifier SA2 is disabled and, as a consequence, the regulating transistor M2 is turned off. Vs is lower than the reference voltage Vref1, and thus, the sensor amplifier SA1 is enabled. Also, the enabled sensor amplifier SA1 outputs an output signal in the high-state to turn on the regulating transistor M1. More specifically, the output pin of the sensor amplifier SA1 is directly connected to the gate of the regulating transistor M1, and the high-state output signal turns on the regulating transistor M1. Thus, in this early stage, only the first regulating transistor M1 is turned on and, thus, only the first current regulating circuit conducts the current, while the other current regulating circuits are turned off.

As Vrect increases, the current i1 flows through the first group LED1, causing LED1 to emit light. Then, the current i1 flows through the transistors UHV1, M1 and the current sensing resistor Rs to the ground. When the voltage level at the node N1 reaches a preset level, the detector 1 sends an output signal to the sensor amplifier SA2 so that the sensor amplifier SA2 turns on the regulating transistor M2 and the current i2 flows through LED2. Thus, in this stage, both current i1 and i2 flows through LED1 and LED2, respectively.

As Vrect further increases to the level where the voltage Vs is higher than Vref1, the sensor amplifier SA1 sends a low-state output signal to the regulating transistor M1 to thereby turn off the regulating transistor M1. In this stage, only the current i2 flows through LED1 and LED2. When the current i1 is cut off (or, set to a minimal level), the overall efficiency of the driver 60 increases. It is because LED2 would produce more light if more current flows therethough, and, cutting off (or reducing) the current i1 would cause the current i1 to be redirected to LED2.

The same analogy applies to other current regulating circuits corresponding to Groups 2-4. For example, the current regulating circuit for LED3 is turned off until the detector 2 sends a high-state output signal to the sensor amplifier SA3. Also, the current regulating circuit for LED3 is turned off when Vs is higher than Vref3.

When the source voltage (or the rectified voltage Vrect) reaches its peak, the current regulating circuits for LED1, LED2, and LED3 are turned off. As Vrect starts descending, the above process reverses so that the first current regulating circuit turns back on last.

Figure 7:
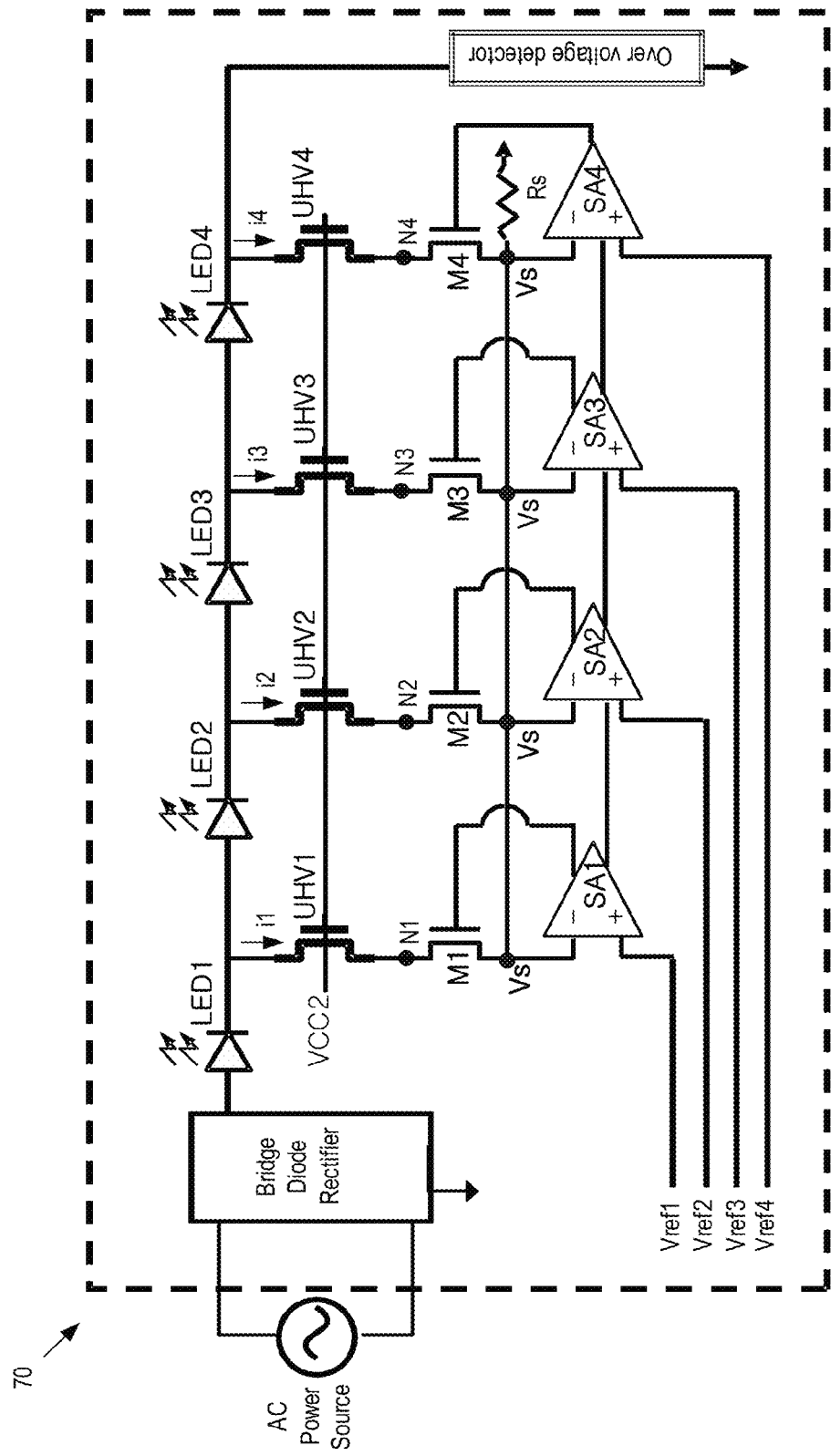
FIG. 7 shows a schematic diagram of an LED driver circuit in accordance with another embodiment of the present invention.

FIG. 7 shows a schematic diagram of an LED driver circuit 70 in accordance with another embodiment of the present invention. As depicted, the driver circuit 70 is similar to the driver circuit 60, with the differences that the driver 70 does not include detectors and that an output signal of a sensor amplifier, say SA1, is input to the downstream sensor amplifier, say SA2. For example, the current regulating circuits of LED2, LED3, and LED4 are turned off when Vrect is at the ground level. As the voltage Vs reaches a preset level, the sensor amplifier SA1 sends an output signal to the sensor amplifier SA2 so that the sensor amplifier SA2 turns on the regulating transistor M2, allowing the current i2 to flow through LED2. Thus, in this stage, both current i1 and i2 flows through LED1 and LED2, respectively.

As Vrect further increases to the level where the voltage Vs is higher than Vref1, the sensor amplifier SA1 sends a low-state output signal to the regulating transistor M1 to thereby turn off the regulating transistor M1. In this stage, only the current i2 flows through LED1 and LED2.

The same analogy applies to other current regulating circuits corresponding to Groups 2-4. For example, the current regulating circuit for LED3 remains in the disabled state until the sensor amplifier SA2 sends a high-state output signal to the sensor amplifier SA3. Also, the current regulating circuit for LED3 is turned off (or, disabled) when Vs is higher than Vref3. The sensor amplifier SA3 has three inputs; the source voltage Vs of M3, reference voltage Vref3, and the output signal from SA2.

Figure 8:
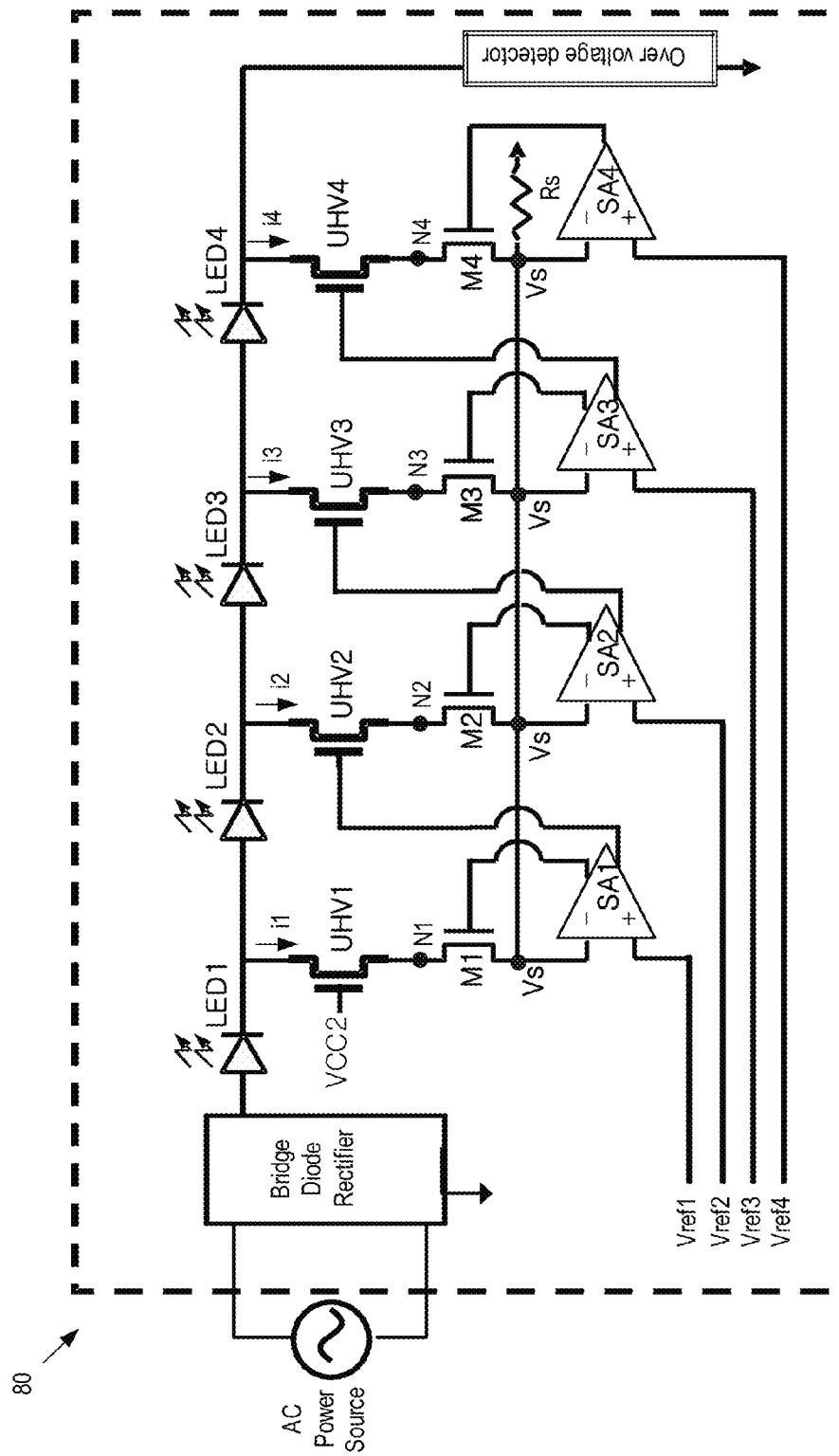
FIG. 8 shows a schematic diagram of an LED driver circuit in accordance with another embodiment of the present invention.

FIG. 8 shows a schematic diagram of an LED driver circuit 80 in accordance with another embodiment of the present invention. As depicted, the driver circuit 80 is similar to the driver circuit 70 in FIG. 7, the difference being that an output pin of each sensor amplifier is connected to the gate of the shielding transistor of the downstream current regulating circuit, to thereby control the current flowing through the downstream current regulating circuit. For instance, the shielding transistors UHV2, UHV2, and UHV3 are turned off and UHV1 is turned on when Vrect is at the ground level. As the voltage Vs increases to a preset level, the sensor amplifier SA1 sends an output signal to the gate of the shielding transistor UHV2 to thereby turn on the transistor UHV2.

As Vrect further increases to the level where the voltage Vs is higher than Vref1, the sensor amplifier SA1 sends a low-state output signal to the regulating transistor M1 to thereby turn off the regulating transistor M1. In this stage, only the current i2 flows through LED1 and LED2.

The same analogy applies to other current regulating circuits. It is noted that the gate of the first shielding transistor UHV1 is maintained at a constant level so that the current regulating circuit of LED1 is turned on when Vrect is at the ground level.

Figure 9:
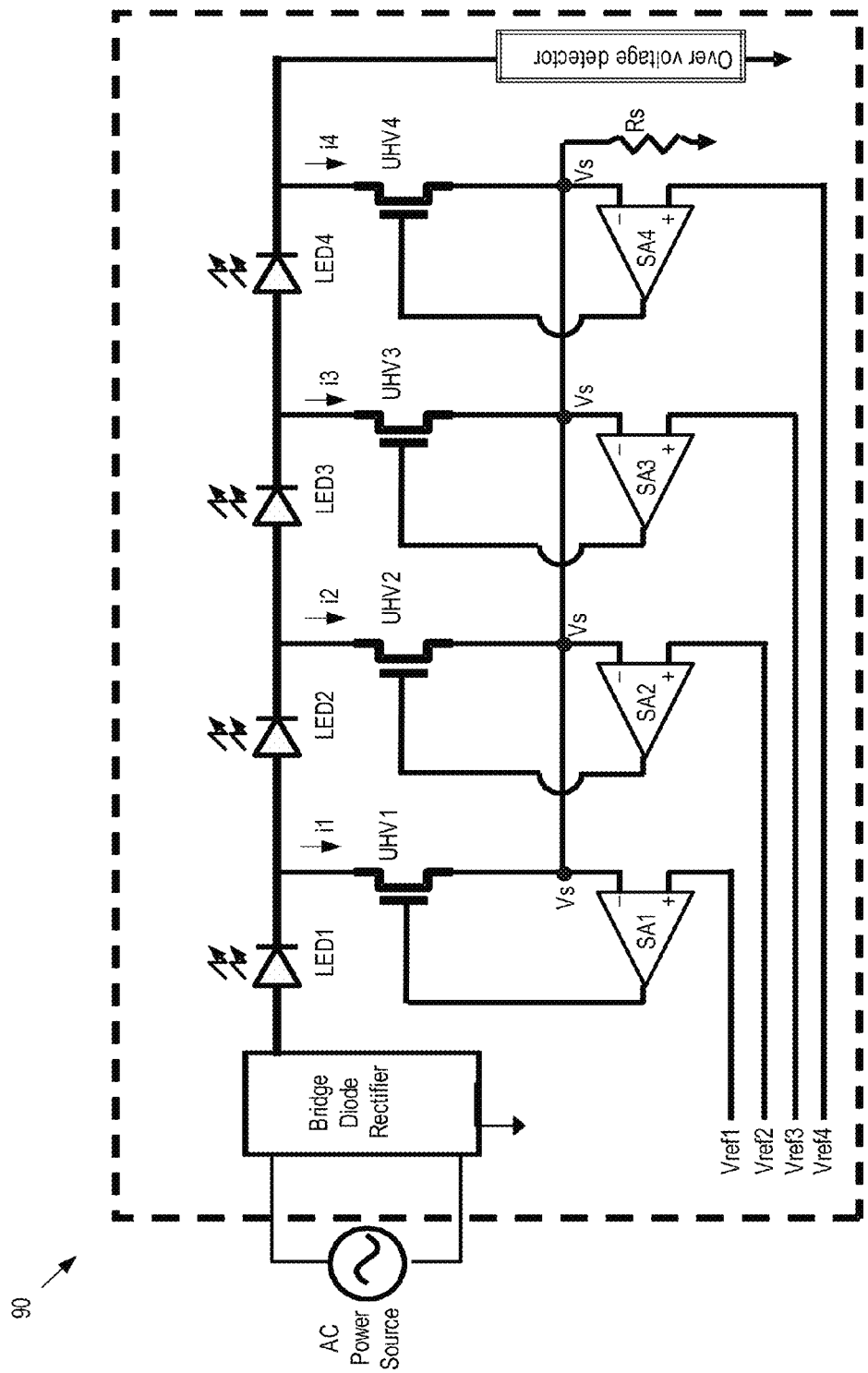
FIG. 9 shows a schematic diagram of an LED driver circuit in accordance with another embodiment of the present invention.

FIG. 9 shows a schematic diagram of an LED driver circuit 90 in accordance with another embodiment of the present invention. As depicted, each current regulating circuit includes a transistor (say, UHV1) and a sensor amplifier (say, SA1). As discussed above, the cascode structure in FIGS. 1-8, which is implemented as a current sink, has various advantages compared to a single transistor current sink. However, the single transistor current sink has an advantage that the manufacturing cost is lower than the cascade structure.

As the voltage of the power source increases enough to turn on LED1, the current i1 flows through the transistor UHV1 and Rs to the ground. Note that the first current regulating circuit may be turned on before, at, or after the rectified voltage Vrect reaches a level enough to power LED1. The same analogy applies to other regulating circuits corresponding to Groups 2-4. When Vrect is high enough to power LED1 but not enough to turn on LED2, the sensor amplifier SA1 compares the voltage level Vs with the reference voltage Vref1 and sends a control signal to the transistor, UHV1, to regulate the current i1. More specifically, the output signal of the sensor amplifier SA1 is input to the gate of the regulating transistor UHV1.

As Vrect increases, it reaches a level enough to power LED1 and LED2. Then, the second regulating circuit (i.e., UHV2 and SA2) conducts, and LED1 and LED2 are turned on. As discussed above, the second current regulating circuit may be turned on before, at, or after Vrect reaches the level enough to power LED1 and LED2. The sensor amplifier SA2 compares the voltage level Vs with Vref2 and sends a control signal to the transistor, UHV2.

When the second current regulating circuit is on, the overall efficiency of the driver 90 will be enhanced if the current i1 is cut off (or, set to a minimal level). It is because LED2 would produce more light if more current flows therethough, and, cutting off (or reducing) the current i1 would cause the current i1 to be redirected to LED2. In the driver 90, as the current i2 starts flowing, the voltage Vs further increases and exceeds Vref1 at some point in time. At this point, the SA1 sends a signal to UHV1, to thereby shut off the current i1.

Same analogy applies for subsequent groups. Generally speaking, when a downstream LED group is turned on and the current regulating circuit associated with the downstream group conducts, the current regulating circuit associated with upstream groups can be turned off (or, the current flowing through the regulating circuit is set to a minimal level) to enhance the overall efficiency of the driver circuit 90.

Once the source voltage (or the rectified voltage Vrect) reaches its peak and starts descending, the above process reverses so that the first current regulating circuit turns back on last. Note that as the source voltage decreases to a level insufficient to keep the downstream group on, the downstream group is naturally turned off even though its associated regulating circuit might be on.

Figure 10:
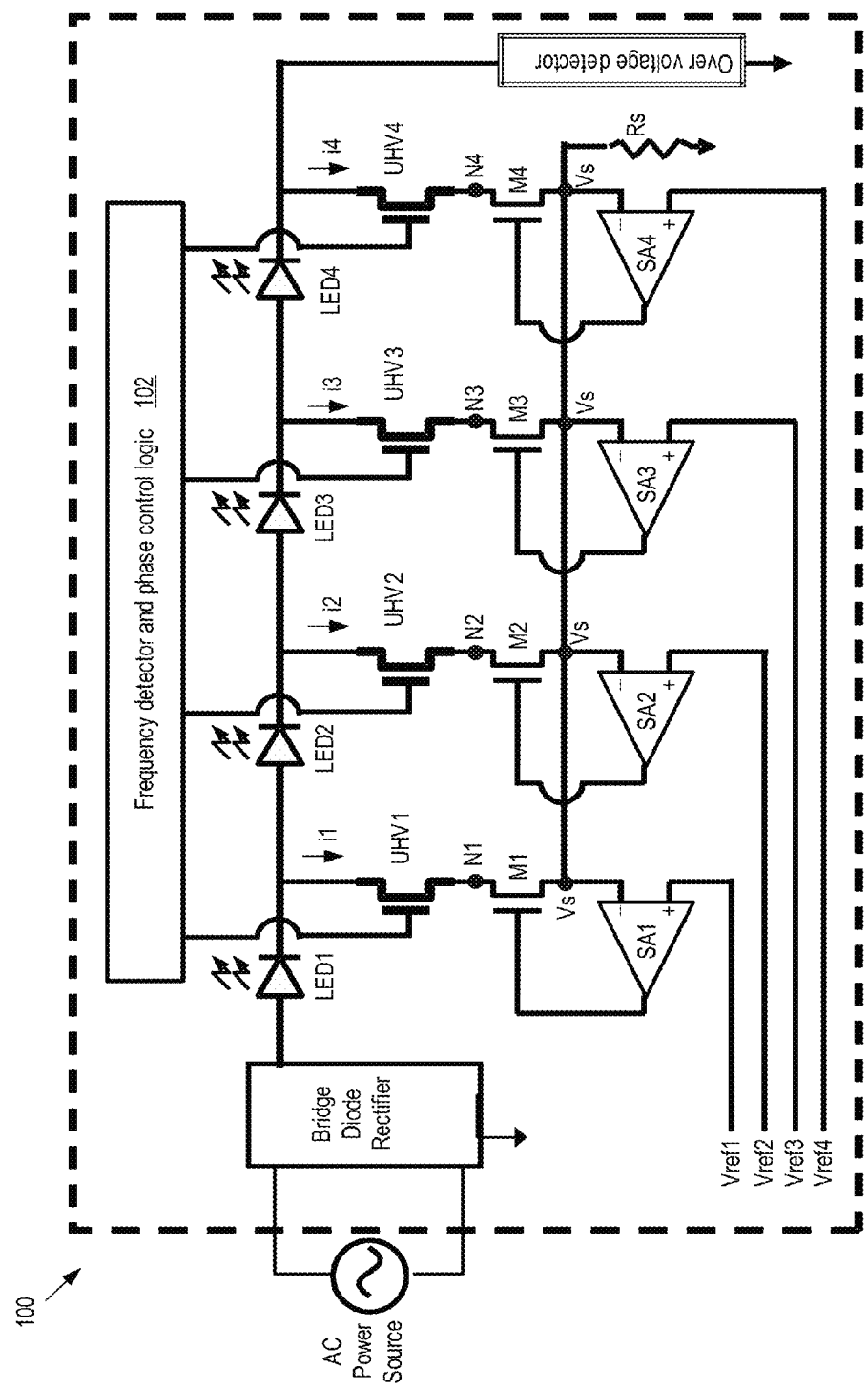
FIG. 10 shows a schematic diagram of an LED driver circuit in accordance with another embodiment of the present invention.

FIG. 10 shows a schematic diagram of an LED driver circuit 100 in accordance with another embodiment of the present invention. As depicted, the driver circuit 100 is similar to the driver circuit 10 in FIG. 1, the difference being that a frequency-detector and phase-control-logic (or, shortly, phase-control-logic) 102 sends signals to UHV1-UHV4. The driver 100 can turn on/off each group of LEDs successively according to the signals received from the phase-control-logic 102. For example, the phase-control-logic 102 sends a signal to the gate of a shielding transistor UHV1 to turn it on, while the other shielding transistors UHV2-UHV4 are turned off. As will be discussed on conjunction with FIGS. 14A-14F, the phase-control-logic 102 may send output signals to the shielding transistors UHV1-UHV4 to control them in various time sequences.

In another example, the phase-control-logic 102 sends signals to more than one shielding transistors, say UHV1 and UHV2, to turn on more than one shielding transistors, say UHV1 and UHV2.

The sensor amplifiers SA1-SA4 control the gates of the regulating transistors M1-M4 in the similar manner as described in conjunction with the driver 10. Thus, the current flowing through each current regulating circuit, say i1, is controlled by either the sensor amplifier, say SA1, or the phase-control-logic 102 or both.

Figure 11:
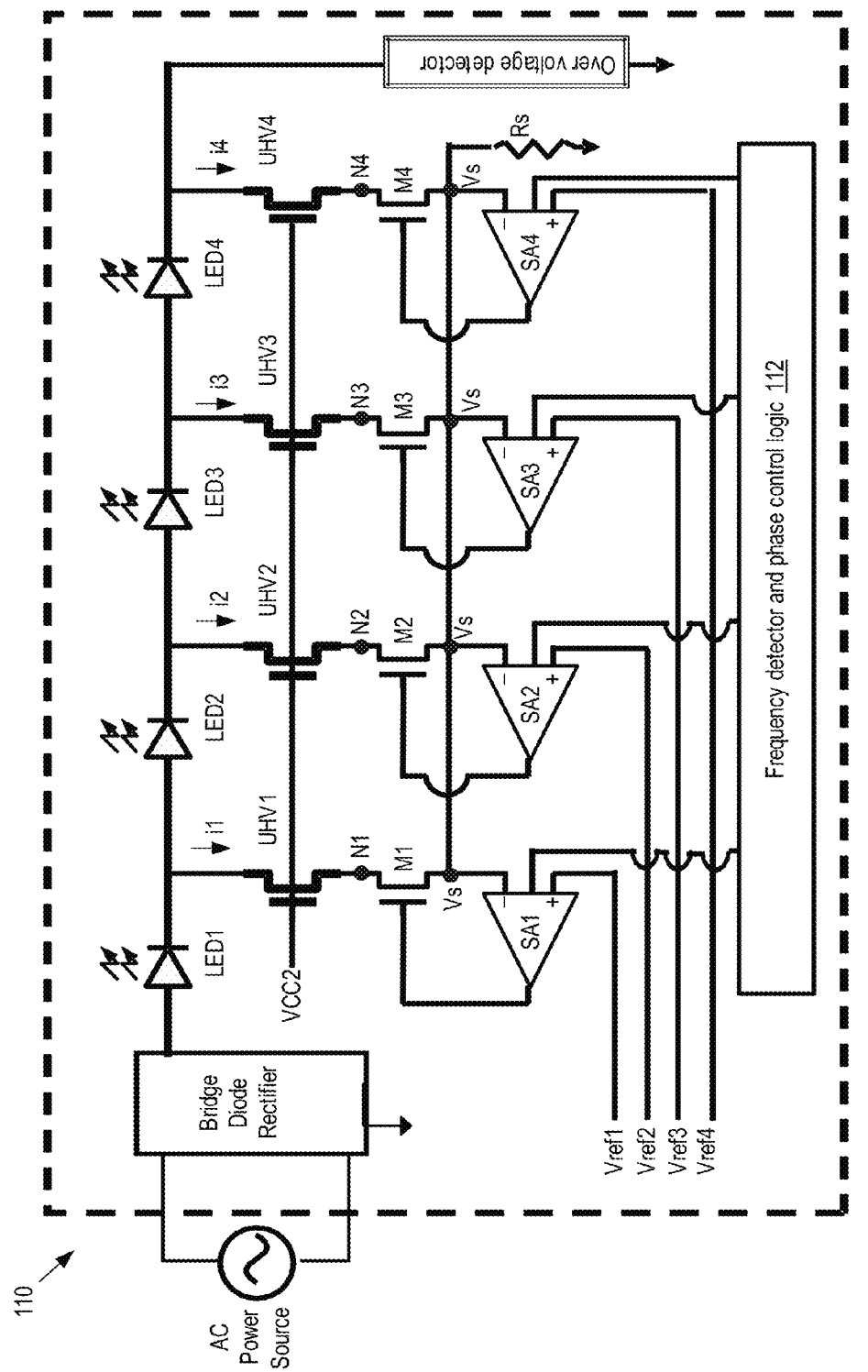
FIG. 11 shows a schematic diagram of an LED driver circuit in accordance with another embodiment of the present invention.

FIG. 11 shows a schematic diagram of an LED driver circuit 110 in accordance with another embodiment of the present invention. As depicted, the driver circuit 110 is similar to the driver circuit 100 in FIG. 10, the difference being that the phase-control-logic 112 sends signals to SA1-SA4.

The driver 110 can turn on/off each group of LEDs successively according to the signals received from the phase-control-logic 112. For example, the phase-control-logic 112 sends a signal to the sensor amplifier SA1 to turn on the regulating transistor M1, while the other regulating transistors M2-M4 are turned off. As will be discussed on conjunction with FIGS. 14A-14F, the phase-control-logic 112 may send output signals to the sensor amplifiers SA1-SA4 to control the regulating transistors M1-M4 in various time sequences.

In another example, the phase-control-logic 112 sends signals to more than one sensor amplifiers, say SA1 and SA2, to turn on more than one regulating transistors, say M1 and M2. As Vrect increases from the ground level, the current flows only through the first LED group, i.e., only the current i1 flows. As Vrect further increases enough to turn on the first and second LED groups, LED1 and LED2 (or Group 1 and Group 2), the current i2 starts flowing through the second current regulating circuit. At the same time, Vs further increases and exceeds Vref1 at a point in time. At this point, the feedback loop control mechanism cuts off the current i1, i.e., the sensor amplifier SA1 compares the voltage level Vs with the reference voltage Vref1 and sends a control signal to the regulating transistor, M1. More specifically, when Vs is higher than Vref1, the sensor amplifier SA1 sends a low-state output signal to the regulating transistor M1 to thereby turn off the regulating transistor M1.

In another example, the sensor amplifier SA1 controls the regulating transistor M1 based on the output signals of the phase-control-logic 112 only. Thus, each sensor signal has three inputs: Vs, Vref, and the signal from the phase-control-logic 112.

The same analogy applies to other current regulating circuits corresponding to Groups 2-4. For example, the current i3 is controlled by the sensor amplifier SA3 based on either the output signal of the phase-control-logic 112 or Vs/Vref3 or both. When the source voltage (or the rectified voltage Vrect) reaches its peak and Vrect starts descending, the above process reverses so that the first current regulating circuit turns back on last.

Figure 12A:
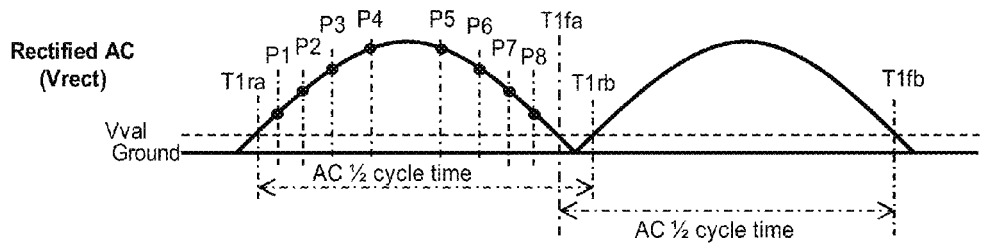
FIGS. 12A-12C show various waveforms of the rectified voltage that might be input to the drivers of FIGS. 1-11.

As discussed above, the phase-control-logics 102 and 112 send signals to the shielding transistors UHV1-UHV4 and sensor amplifiers SA1-SA4, respectively. Since both phase-control-logic 102 and 112 have the similar structure and operational mechanism, only the phase-control-logic 112 is described in detail. The operation of the phase-control-logic 112 includes measuring the AC ½ cycle time, where the AC ½ cycle time refers to half the cycle period of AC signal. FIG. 12A shows the waveform of a rectified voltage input to the driver 110 as a function of time, where the AC ½ cycle time is the time interval between T1ra and T1rb or between T1fa and T1fb. FIG. 12D shows a schematic diagram of the phase-control-logic 112 of FIG. 11. As depicted in FIG. 12D, the detector 113 monitors the voltage level of Vrect and sends a signal, enable 1, when Vrect rises to a preset level, such as Vval. For instance, the detector 113 sends the first enable signal at T1ra. Then, the clock counter 114 starts counting the clock signals received from the oscillator 116. As Vrect rises to the Vval at T1rb, the detector 113 sends the second enable signal to the clock counter 114 and the clock counter 114 stops counting the clock signals. Subsequently, the measure counter value is transferred (or, loaded) to the frequency selector 115 to determine the frequency of AC input (or, Vrect). Upon transferring the measured counter value, the clock counter 114 resets the counter value and starts counting again to keep monitoring of rectified AC voltage frequency.

Based on the determined frequency, the frequency selector 115 chooses preset time intervals for the switch tabs (or, shortly, tabs). The driver 110 (shown in FIG. 11) include four tabs that correspond to the input pins of the sensor amplifiers SA1-SA4, and the frequency selector 115 assigns a preset time interval to each tab, where the preset time interval refers to the time interval between a reference point (such as T1ra) and the time when a signal is to be sent to the corresponding tab (such as P1 in FIG. 12A).

The detector 117 monitors the level of descending (or rising) Vrect and sends an enable signal, enable 2, when Vrect falls (or rises) to a predetermined voltage level, such as Vval. Then, the clock counter 118 starts counting the clock signal generated by the oscillator 116. Subsequently, the tab selector 119 receives the count from the clock counter 118. Then, the tab selector 119 compares the count received from the clock counter 118 to the preset time interval received from the frequency selector 115, and sends a switch enabling signal to the corresponding one of the tabs 120 when the count of the clock counter 118 matches the preset time interval. Upon receiving the switch enabling signal from tab selector 119, the corresponding tab, such as the sensor amplifier SA1, turns on/off the regulating transistor M1.

In FIG. 11, there are four sensor amplifiers and thus, eight preset time intervals (i.e., the time intervals between T1ra and P1, T1ra and P2, T1ra and P3, T1ra and P4, T1ra and P5, T1ra and P6, T1ra and P7, and T1ra and P8, as shown in FIG. 12A) are assigned to the corresponding sensor amplifiers by the frequency selector 115. Since each of the preset time intervals corresponds to a fixed phase point of the input voltage waveform, each of the preset time intervals also refers to a phase difference between the reference phase at T1ra and the phase at the corresponding point, such as P1. As such, the terms "preset time interval" and "preset phase difference" are used interchangeably.

It is noted that the detector 113 may send the enable signal when Vrect rises or falls to Vval. For example, the detector 113 may send the enable signal at T1fa and T1fb (or, T1 ra and T1rb) so that the clock counter 114 can count the clock signals during one AC ½ cycle time. Likewise, the detector 117 may send the enable signal when Vrect rises or falls to Vval. It is also noted that the detectors 113 and 117 may send enable signals at different preset voltage levels.

A digital locked loop or a phase locked loop may be used in place of the clock counter 114 (or, clock counter 118). As the DLL, PLL, and clock counter are well known in the art, the detailed description is not given in the present document.

Figure 12B:
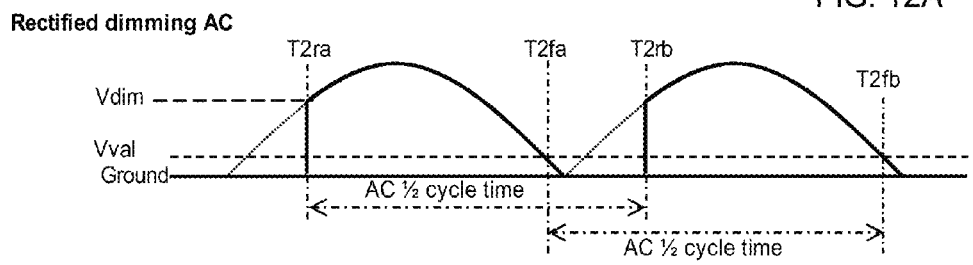
Figure 12C:
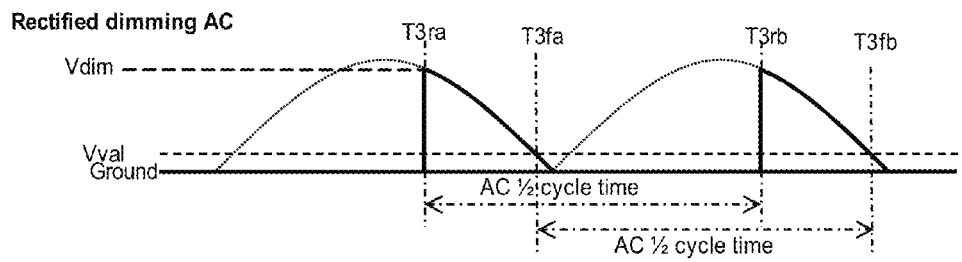
Figure 12D:
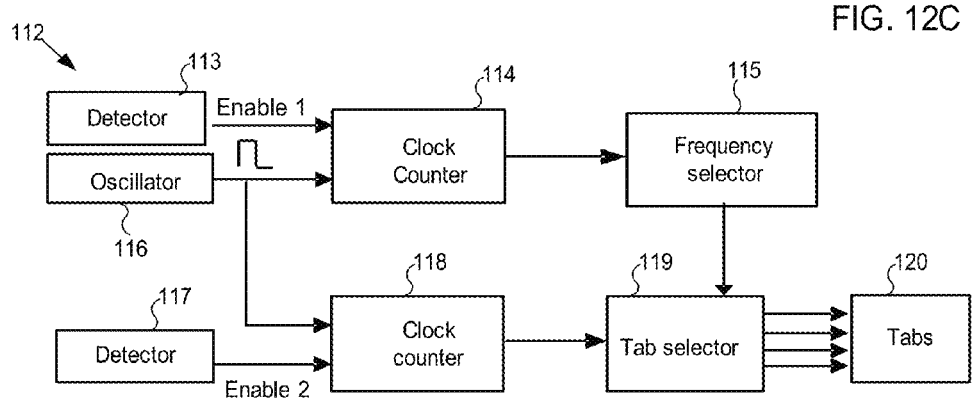
FIG. 12D shows a schematic diagram of the frequency detector and phase control logic of FIGS. 10 and 11.

FIGS. 12B and 12C show various waveforms of the rectified voltage input to the driver 110 of FIG. 11, where the AC input voltage is processed by dimmer switches. As depicted, the dimmer switch maintains the AC input voltage to the ground level until the AC input voltage rises to Vdim (FIG. 12B) or falls to Vdim (FIG. 12C). The phase-control-logic 112 may measure AC ½ cycle time by counting the clock signal between T2ra and T2rb or between T2fa and T2fb. More specifically, the detectors 113 and 117 may send enable signals at one of the points in time, T2ra, T2rb, T2fa, and T2fb. The same analogy applies to Vrect in FIG. 12C, i.e., the detectors 113 and 117 may send enable signals at one of the points in time, T3ra, T3rb, T3fa, and T3fb.

As described above, the phase-control-logic 112 controls the currents i1-i4 based on the frequency and phase of the AC input voltage waveform. This approach is useful when the noise level of the AC power source is high and/or it is preferable to make the current waveform smoothly follow the AC input voltage waveform. If the current i1 is controlled by the feedback control mechanism only, the current i1 will fluctuate significantly when the noise level of Vrect is high since the feedback control mechanism relies on the level of Vrect. The fluctuation of current flows i1-i4 may result in the luminance flicker that can be perceived by human eyes.

Figure 13A:
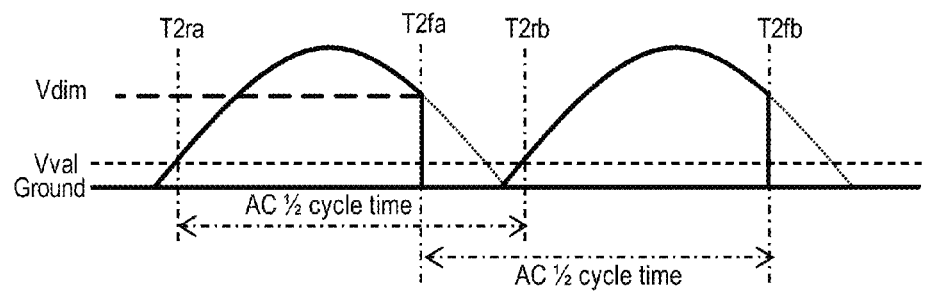
FIGS. 13A-13B show various waveforms of the rectified voltage that might be input to the driver of FIGS. 1-11.
Figure 13B:
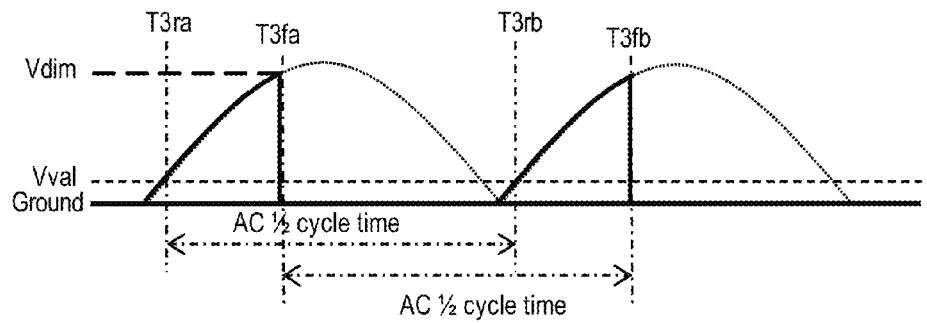

FIGS. 13A and 13B show two waveforms of the rectified voltage that might be input to the driver 110 of FIG. 11. (It is noted that the waveforms in FIGS. 12A-12C and 13A-13B may be input to the driver circuits in FIGS. 1-10, too.) Unlike the dimmers used to generate the waveforms in FIGS. 12B and 12C, the dimmers used to generate the waveforms in FIGS. 13A and 13B cuts off the rear portion of each cycle, i.e., Vrect is maintained at the ground level after Vrect rises/falls to Vdim. As the phase-control-logic 112 measures the frequency and phase in the same manner as described in conjunction with FIGS. 12B and 12C, the detailed description of the operational procedures of the phase-control-logic 112 is not repeated for brevity.

FIG. 14A shows output signals of the phase-control-logic 112 of FIG. 11, where the four tab switches (or, shortly tabs) correspond to the four sensor amplifiers SA1-SA4. More specifically, each tab switch signal, say tab 1 switch signal, is sent to the corresponding sensor amplifier, say SA1, so that the sensor amplifier turns on/off the corresponding regulating transistor, say M1. As depicted in FIG. 14A, the hat-shaped portions of each tab switch signal waveform represent the time intervals when the corresponding sensor amplifier is turned on, i.e., the tab switch signal is in the active state. As such, the signals sent to the sensor amplifiers are sequenced in time so that only one of the regulating transistors M1-M4 is turned on at each point in time. More specifically, turn-on and turn-off signals are sent by the phase-control-logic 112 to SA1 at P1 and P2, respectively. (Here, P1-P8 of FIG. 14A correspond to P1-P8 of FIG. 12A, respectively.) Likewise, SA2, SA3, and SA4 are turned on/off by signals at P2/P3, P3/P4, and P4/P5, respectively. When the Vrect decreases from its peak, SA3, SA2, and SA1 are turned on/off by signals sent at P5/P6, P6/P7, and P7/P8, respectively. As such, only one sensor amplifier is turned on (i.e., in the active state) at each point in time. It is noted that each sensor amplifier, say SA1, continuously compares the source voltage, say Vs, of the corresponding regulating transistor, say M1, with Vref1 and regulates the current flow so that the Vs remains same as Vref1 when the sensor amplifier is in active state.

FIG. 14B shows output signals of the phase-control-logic 112 of FIG. 11 according to another embodiment. Unlike the signal waveforms in FIG. 14A, the tab switch signals sent to the sensor amplifiers are sequenced in time so that one or more regulating transistors are turned on simultaneously. For instance, the regulating transistor M1 is turned on/off by the signals at P1/P8, while the regulating transistor M2 is turned on/off by the signals at P2/P7. Thus, the regulating transistor M2 connected to the tab 2 switch is turned on while the regulating transistor M1 connected to the tab 1 switch has been already turned on. It is noted that sensor amplifier SA1 may further control the regulating transistor M1 by use of the feedback loop, as discussed in conjunction with FIG. 11. Thus, it is possible that only one of the regulating transistors M1-M4 may be turned on, even though all of the tab switch signals sent by phase-control-logic 112 are in the active state.

In one example, the phase-control-logic 112 sends a signal to SA1 to turn on M1 at P1. At P1, the current may flow only through the first LED group, i.e., only the current i1 flows. At P2, a signal is sent to SA2 to turn on M2. As Vrect further increases enough to turn on the first and second LED groups, LED1 and LED2 (or Group 1 and Group 2), the current i2 starts flowing through the second current regulating circuit. At the same time, Vs further increases and exceeds Vref1 at a point in time. At this point, the feedback loop control mechanism cuts off the current i1, i.e., the sensor amplifier SA1 compares the voltage level Vs with the reference voltage Vref1 and sends a control signal to the regulating transistor, M1. More specifically, when the voltage Vs is higher than Vref1, the sensor amplifier SA1 sends a low-state output signal to the regulating transistor M1 to thereby turn off the regulating transistor M1.

FIGS. 14C and 14D show output signals of the phase-control-logic 112 of FIG. 11 according to another embodiment. As depicted, the waveform of Vrect is similar to Vrect in FIG. 13A, i.e., a dimmer is used to generate the waveform in FIGS. 14C and 14D. The timing sequences in FIGS. 14C and 14D are similar to those in FIGS. 14A and 14B, respectively, i.e., only one sensor amplifier is turned on at each point in time (FIG. 14C), or more than one sensor amplifier may be turned on at each point in time (FIG. 14D). It is noted that, in FIG. 14C, Tab 2 switch, such as SA2, may be in the active state at Pd. However, as Vrect drops to the ground level at Pd, the current flowing through the second current regulating circuit will also drop to zero at Pd. Also, there will be no current flowing through the LED groups between P7 and P8, even though SA1 is in the active state. As such, the total light emitted by the LED groups will be diminished as intended by the dimmer designer. Likewise, as depicted in FIG. 14D, both Tab 1 switch and Tab 2 switch are in the active state at Pd. However, as Vrect drops to the ground level at Pd, the current flowing through the LED groups will also drop to zero, to thereby reducing the total light emitted by the LED groups.

FIGS. 14E and 14F show output signals of the phase-control-logic 112 of FIG. 11 according to another embodiment. As depicted, the waveform of Vrect is similar to Vrect in FIG. 12B, i.e., a dimmer is used to generate the waveform in FIGS. 14E and 14F. The timing sequences in FIGS. 14E and 14F are similar to those in FIGS. 14A and 14B, respectively, i.e., only one sensor amplifier is turned on at each point in time (FIG. 14E), or more than one sensor amplifier may be turned on at each point in time (FIG. 14F). It is noted that, in FIG. 14E, Tab 2 switch, such as SA2, is turned on at P2. However, as Vrect rises from the ground level at Pd, the current will begin to flow through the second current regulating circuit at Pd, i.e., the current will not flow between P2 and Pd. Also, there will be no current flowing through the LED groups between P1 and P2, even though SA1 is in the active state. As such, the total light emitted by the LED groups will be diminished as intended by the dimmer designer. Likewise, as depicted in FIG. 14F, both Tab 1 switch and Tab 2 switch are in the active state at Pd. However, as Vrect rises from the ground level at Pd, no current flows through the LED groups between P1 and Pd, to thereby reducing the total light emitted by the LED groups.

As discussed above, the structure and operational mechanism of the phase-control-logic 102 are similar to those of phase-control-logic 112, the difference being that the four tabs of the phase-control-logic 102 correspond to the gates of the shielding transistors UHV1-UHV4. The phase-control-logic 102 controls the current flows i1-i4 by sending signals to the shielding transistors UHV1-UHV4, based on the approaches described in conjunction with FIGS. 12A-14F.

Figure 15A:
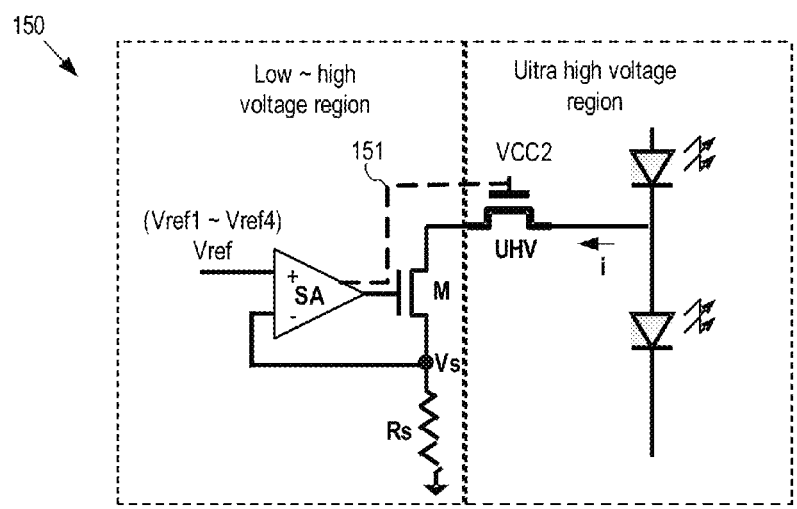
FIGS. 15A-15C show schematic diagrams of circuits for controlling the current flowing through a transistor in accordance with another embodiment of the present invention.

FIG. 15A shows a schematic diagram of a circuit 150 for controlling the current i flowing through a regulating transistor M, where the circuit 150 is included in the driver circuits in FIGS. 1-8 and 10-11. As depicted, the sensor amplifier SA compares the reference voltage Vref to the voltage level Vs and sends a signal to the gate of the regulating transistor M to control the current i. It is noted that the sensor amplifiers have different reference voltages Vref, as described in FIGS. 1-8 and 10-11. Thus, the reference voltage Vref in FIG. 15A can be one of the reference voltages Vref1-Vref4. It is also noted that the driver circuit 90 in FIG. 9 does not have regulating transistor and, as such, when the circuit 150 is used in the driver circuit 90, an output signal from the sensor amplifier SA is sent to the gate of the transistor UHV, as indicated by a broken line 151 (i.e., the constant voltage VCC2 is not applied to UHV).

The types and operational mechanisms of the components of the circuit 150 are described in conjunction with FIG. 1. For example, the regulating transistor M can be LV/MV/HV NMOS, while the shielding transistor can be UHV NMOS. For brevity, the description of other components is not repeated.

Figure 15B:
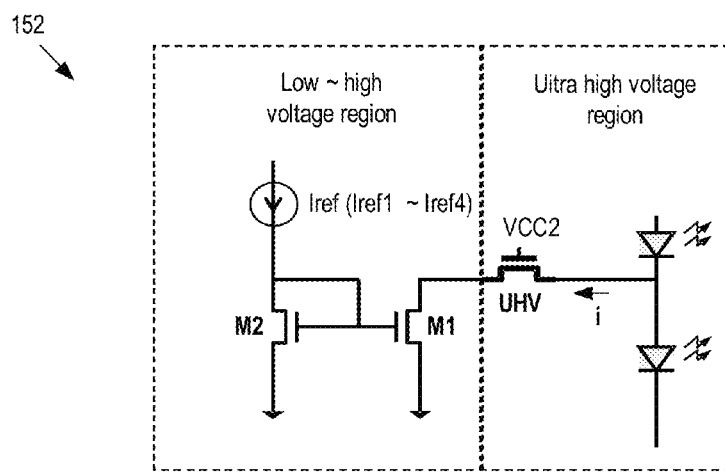

FIG. 15B shows a schematic diagram of a circuit 152 for controlling the current i flowing through a regulating transistor M1 in accordance with another embodiment of the present invention. As depicted, another transistor M2, which is identical to the regulating transistor M1, is connected to the regulating transistor M1 to form a current mirror configuration. More specifically, the gates of the two transistors M1, M2 are electrically connected to each other to have the same gate voltage. The current Iref flowing through the second transistor M2 is controlled to regulate the current i flowing through the regulating transistor M1. The current regulating circuit 152 may be used in place of the current regulating circuit 150 of FIG. 15A, and as such, the current regulating circuit 152 may be used in the driver circuits of FIGS. 1-11. It is noted that the reference currents Iref1-Iref4 are provided in place of the reference voltages Vref1-Vref4. It is also noted that the current regulating circuit 152, compared to the circuit 150, does not include any sensor amplifier. Also, the circuit 152 does not include the current sensing resistor Rs.

Figure 15C:
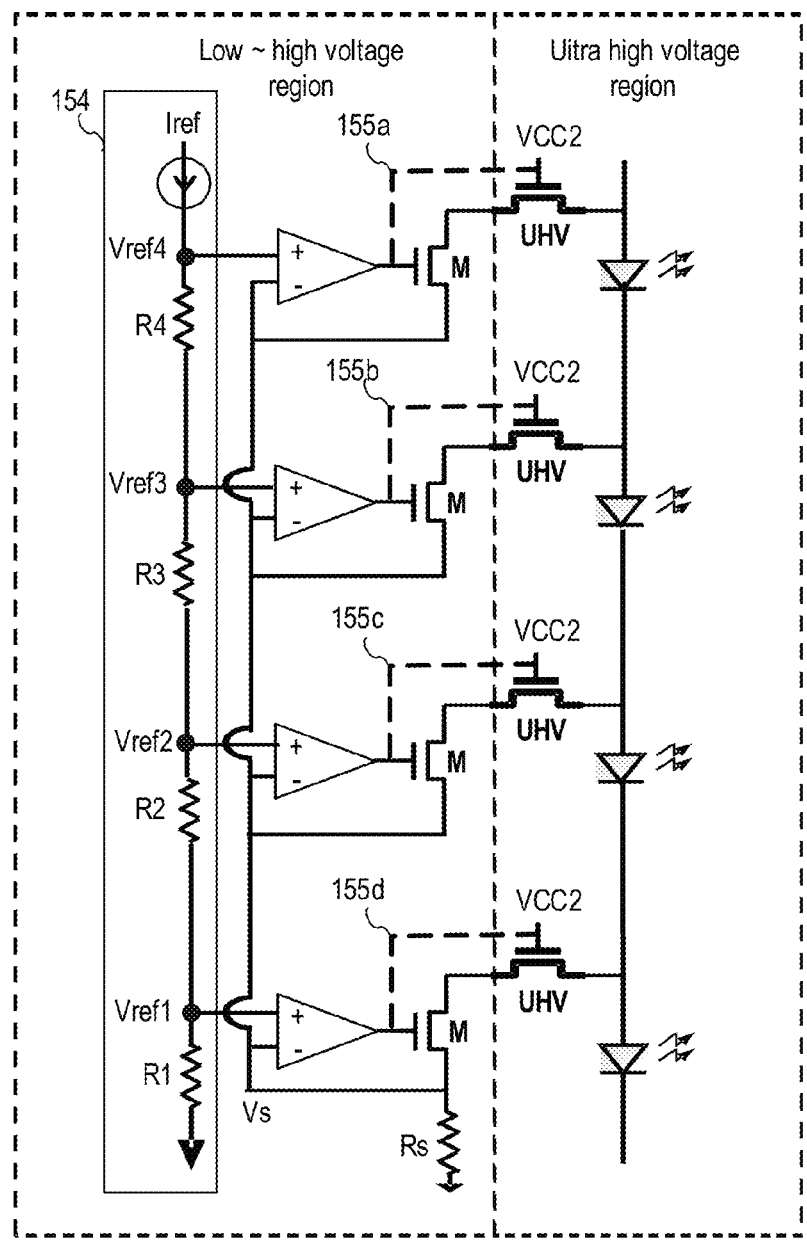

FIG. 15C shows a schematic diagram of a circuit 154 for controlling the current i flowing through a regulating transistor M in accordance with another embodiment of the present invention. As depicted, each sensor amplifier SA is provided with a non-inverting input voltage Vref, where Vref is determined by the equation:

$$Vref=Iref*R,$$

where Iref represents current and R represents the total resistance downstream of each voltage node. For instance, Vref3 can be calculated by $$Vref3=Iref*(R1+R2+R3).$$

The current regulating circuit 154 may be used in the driver circuits of FIGS. 1-8 and 10-11. When the circuit 154 is used in the driver circuit 90 of FIG. 9, the output from the sensor amplifier SA is input to the gate of UHV, as indicated by the broken lines 155a-155d, i.e., the constant voltage VCC2 is not applied to the gate of UHV.

Figure 16:
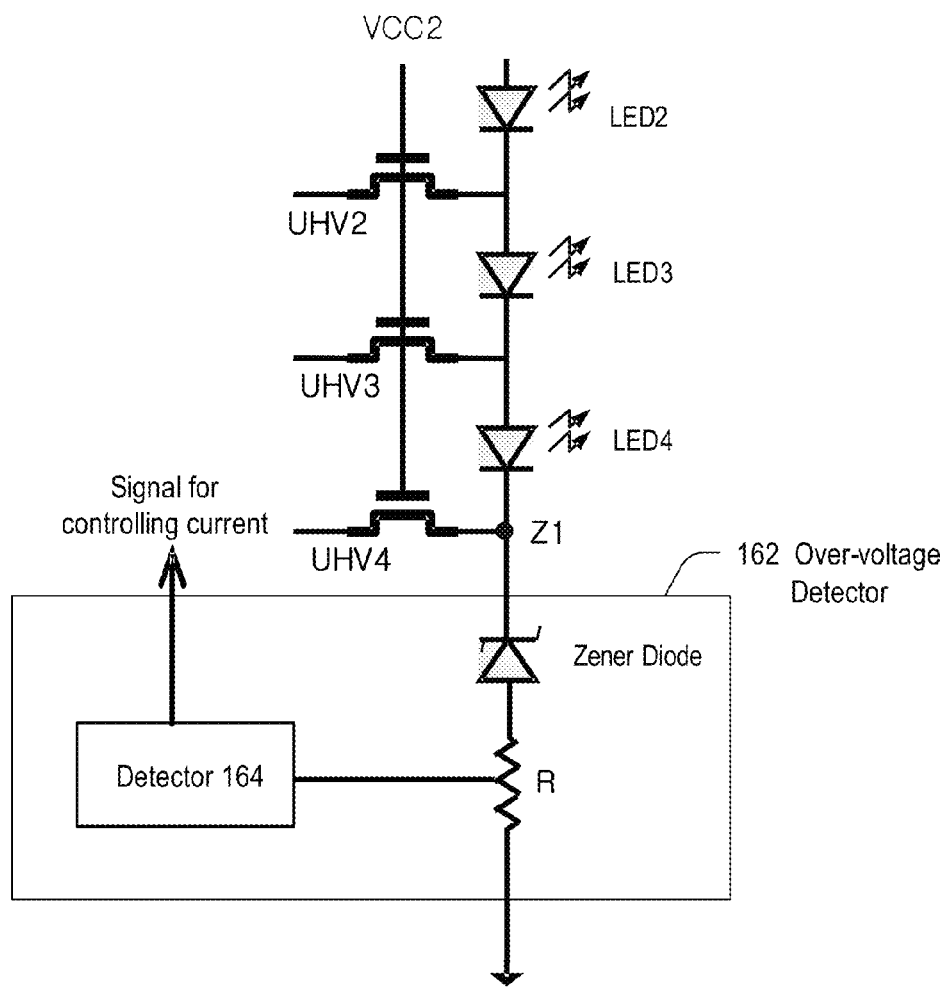
FIG. 16 shows a schematic diagram of an over-voltage detector in accordance with another embodiment of the present invention.

FIG. 16 shows a schematic diagram of an over-voltage detector 162 in accordance with another embodiment of the present invention. As depicted, the over-voltage detector 162 may include: a Zener diode connected to the downstream end of the last LED group; a detector 164 for detecting voltage; and a sensing resistor R. The voltage level at the node Z1 equals the voltage difference between Vrect and the voltage drop by the string of LEDs. When the voltage level at Z1 exceeds a preset level, which is preferably the breakdown voltage of the Zener diode, the current flows through the sensing resistor R. Then, a detector 164 detects the voltage level and sends a signal to a proper component of the driver circuit to thereby control the current flowing through the LEDs, i.e., to cut off the current flowing through the LEDs or to prevent the excess power dissipation in the chip that contains the driver circuits. For example, the output signal of the over-voltage detector 162 is input to the SA4 in FIG. 1 so that the current i4 is cut off. In another example, the output signal is sent to a component (not shown in FIG. 1) that generates the reference voltage Vref1-Vref4 so that the component may reduce reference voltages in FIG. 1. In still another example, the output signal is used to lower the gate voltage VCC2 of the shielding transistors UHVs. It is noted that the over-voltage detector 162 may be also used in the driver circuits of FIGS. 1-11.

Figure 17A:
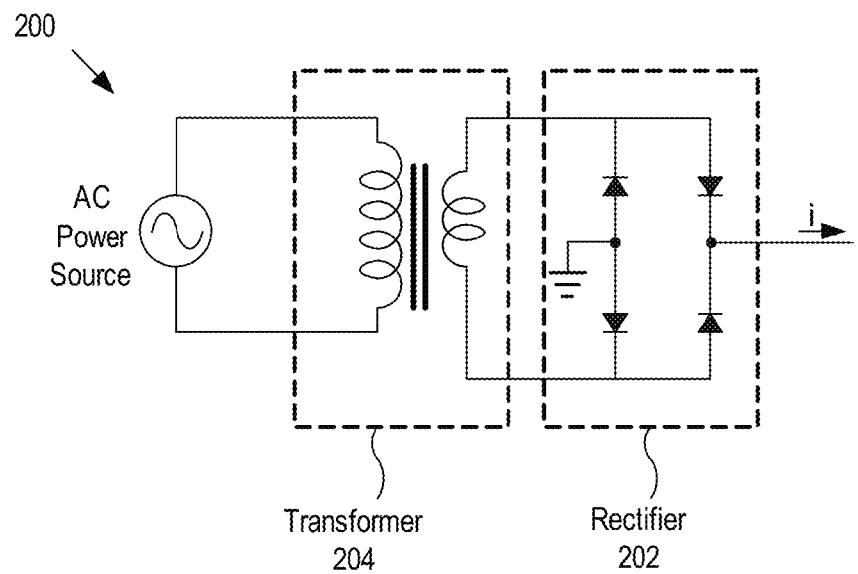
FIGS. 17A-17B show schematic diagrams of input power generators in accordance with another embodiment of the present invention.
Figure 17B:
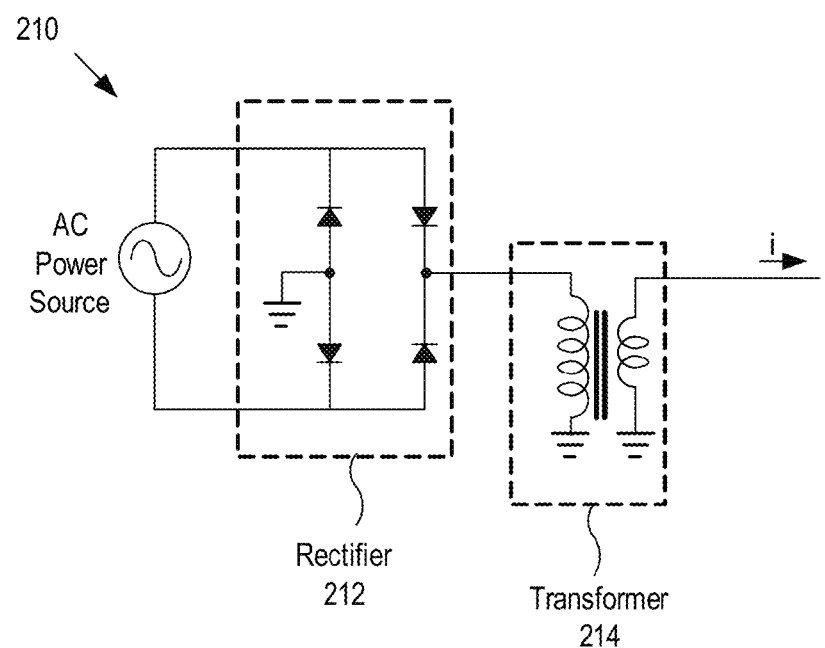

As depicted in FIGS. 1-11, each driver may include a rectifier to rectify the current supplied by an AC power source. In certain applications, such as high power LED street lights, the LEDs may demand high power consumption. In such applications, the driver may be isolated from the AC power source by a transformer for safety purposes. FIGS. 17A-17B show schematic diagrams of input power generators 200 and 210 in accordance with another embodiment of the present invention. As depicted in FIG. 17A, a transformer 204 may be disposed between AC input and the rectifier 202. Alternatively, a rectifier 212 may be disposed between AC input source and the transformer 214, as depicted in FIG. 17B. In both cases, the current i flows through one or more of the LED groups during operation. The input power generators 200 and 210 may be applied to the drivers of FIGS. 1-11.

It should be understood, of course, that the foregoing relates to exemplary embodiments of the invention and that modifications may be made without departing from the spirit and scope of the invention as set forth in the following claims.

What is claimed is:

1. A method for driving light emitting diodes (LEDs), comprising:
   providing a string of LEDs divided into groups, the groups being electrically connected to each other in series;
   providing a power source electrically connected to the string of LEDs;
   coupling each of the groups to a ground through a corresponding one of current regulating circuits, each of the current regulating circuits including a sensor amplifier and a cascade structure having first and second transistors, a source of the first transistor being directly connected to a drain of the second transistor so that the source and the drain have a same voltage potential during operation, each said group being coupled to a different voltage source for providing a different reference voltage thereto;
   measuring a phase of a voltage waveform of the power source;
   turning on the groups in a downstream sequence based on the measured phase;
   applying a gate voltage to a gate of the first transistor;
   inputting the different reference voltage to the sensor amplifier; and
   causing the sensor amplifier to send an output signal to a gate of the second transistor to thereby regulate a current flowing through the second transistor.

2. A method as recited in claim 1, further comprising:
   providing a dimmer switch; and
   causing the dimmer switch to process the voltage waveform to thereby adjust a luminance of the string of the LEDs.

3. A method as recited in claim 1, wherein the step of turning on the groups includes:
   connecting a phase control logic directly to a gate of the first transistor; and
   causing the phase control logic to send an output signal to the gate of the first transistor to thereby regulate a current flowing through the first transistor.

4. A method as recited in claim 1, wherein the step of applying a gate voltage to a gate of the first transistor includes:
   maintaining the gate voltage applied to the gate of the first transistor at a substantially constant level.

5. A method as recited in claim 1, wherein the step of turning on the groups includes:
   connecting a phase control logic directly to the sensor amplifier; and
   causing the phase control logic to send a signal to the sensor amplifier when a difference between the phase of the voltage waveform and a reference phase matches a preset phase difference.

6. A method as recited in claim 1, further comprising:
   causing a reference current to flow through a plurality of resistors in series; and
   taking a voltage at upstream of one of the plurality of the resistor as the different reference voltage.

7. A driver circuit for driving light emitting diodes (LEDs), comprising:
   a string of LEDs divided into n groups, the n groups of LEDs being electrically connected to each other in series, a downstream end of group m−1 being electrically connected to the upstream end of group m, where m being a positive number equal to or less than n, an upstream end of group 1 being configured to be coupled to a power source that provides an input voltage;
   a plurality of current regulating circuits, each of the current regulating circuits being coupled to the downstream end of a corresponding group at one end and coupled to a ground at an other end and including a sensor amplifier and a cascode having first and second transistors, each of the current regulating circuits being coupled to a different reference voltage source; and
   a phase control logic for sending a signal to each of the current regulating circuits to thereby control a current flow through each of the current regulating circuits.

8. A driver as recited in claim 7, wherein the phase control logic includes:
   a frequency selector for determining a frequency of the input voltage and assigning a preset time interval to each of the current regulating circuits; and
   a selector for selecting a particular one of the current regulating circuits and sending a signal to the particular current regulating circuit when a phase of the input voltage matches the preset time interval.

9. A driver as recited in claim 7, wherein the phase control logic is directly connected to a gate of the first transistor.

10. A driver as recited in claim 7, wherein the phase control logic is directly connected to the sensor amplifier.

11. A driver as recited in claim 7, wherein the different reference voltage source includes a reference current source and a plurality of resistors in series.

12. A driver as recited in claim 7, further comprising:
    an over-voltage detector connected to a downstream end of the string of LEDs.

* * * * *